US006651035B1

(12) United States Patent
Lang

(10) Patent No.: US 6,651,035 B1
(45) Date of Patent: Nov. 18, 2003

(54) METHOD FOR DETECTING HEAT EXCHANGER TUBE FAILURES AND THEIR LOCATION WHEN USING INPUT/LOSS PERFORMANCE MONITORING OF A POWER PLANT

(75) Inventor: Fred D Lang, San Rafael, CA (US)

(73) Assignee: Exergetic Systems LLC, San Rafael, CA (US)

( * ) Notice: Subject to any disclaimer, the term of this patent is extended or adjusted under 35 U.S.C. 154(b) by 0 days.

(21) Appl. No.: 10/268,466

(22) Filed: Oct. 9, 2002

Related U.S. Application Data

(63) Continuation-in-part of application No. 10/131,932, filed on Apr. 24, 2002, which is a continuation-in-part of application No. 09/273,711, filed on Mar. 22, 1999, now Pat. No. 6,522,994, which is a continuation-in-part of application No. 09/047,198, filed on Mar. 24, 1998, now abandoned, said application No. 10/131,932, is a continuation-in-part of application No. 09/630,853, filed on Aug. 2, 2000, said application No. 10/131,932, is a continuation-in-part of application No. 10/087,879, filed on Mar. 1, 2002, which is a continuation-in-part of application No. 09/273,711, which is a continuation-in-part of application No. 09/047,198, said application No. 10/087,879, is a continuation-in-part of application No. 09/630,853, said application No. 10/087,879, is a continuation-in-part of application No. 09/827,956, filed on Apr. 4, 2001, now Pat. No. 6,560,563, which is a continuation-in-part of application No. 09/759,061, filed on Jan. 11, 2001, now abandoned, which is a continuation-in-part of application No. 09/273,711, filed on Mar. 22, 1999, now Pat. No. 6,522,994, which is a continuation-in-part of application No. 09/047,198, filed on Mar. 24, 1998, now abandoned, said application No. 10/087,879, filed on Mar. 1, 2002, is a continuation-in-part of application No. 09/971,527, filed on Oct. 5, 2001, which is a continuation-in-part of application No. 09/273,711, which is a continuation-in-part of application No. 09/047,198, said application No. 09/971,527, is a continuation-in-part of application No. 09/630,853, said application No. 09/971,527, is a continuation-in-part of application No. 09/827,956, which is a continuation-in-part of application No. 09/759,061, which is a continuation-in-part of application No. 09/273,711, which is a continuation-in-part of application No. 09/047,198.

(60) Provisional application No. 60/147,717, filed on Aug. 6, 1999.

(51) Int. Cl.[7] .................................... G06F 11/30
(52) U.S. Cl. .................. 702/183; 702/22; 702/51; 165/11.1; 431/16
(58) Field of Search ................. 702/22–25, 30–32, 702/45, 50, 51, 55, 114, 181–185; 60/39, 24, 39.511, 661, 793; 700/27, 42, 86; 703/2; 706/907, 915; 165/11.1, 70; 431/22, 16

(56) References Cited

U.S. PATENT DOCUMENTS

| 3,522,008 | A | * | 7/1970 | Defabaugh et al. ............ 436/3 |
| 3,873,817 | A | * | 3/1975 | Liang ......................... 700/287 |
| 4,014,798 | A | * | 3/1977 | Rembaum ............... 210/500.23 |
| 4,421,716 | A | * | 12/1983 | Hench et al. ............... 376/216 |
| 5,320,967 | A | * | 6/1994 | Avallone et al. .............. 436/50 |
| 5,825,646 | A | * | 10/1998 | Keeler et al. .................. 700/44 |
| 6,192,352 | B1 | * | 2/2001 | Alouani et al. ................ 706/8 |
| 6,484,108 | B1 | * | 11/2002 | Burgmayer et al. ........... 702/51 |
| 2001/0001149 | A1 | * | 5/2001 | Alouani et al. ............. 706/906 |

OTHER PUBLICATIONS

D.F. Shanno and K.H. Phua, "Algorithm 500, Minimization of Unconstrained Multivariate Functions", ACM Transactions on Mathematical Software, vol 2, No 1, Mar. 1976, pp 87–94.

(List continued on next page.)

Primary Examiner—Marc S. Hoff
Assistant Examiner—Manuel L. Barbee
(74) Attorney, Agent, or Firm—Gary Hoenig

(57) ABSTRACT

This invention relates to a fossil-fired thermal system such as a power plant or steam generator, and, more particularly, to a method for rapid detection of tube failures and their location with the steam generator, without need for direct instumentation, thereby preventing more serious damage and minimizing repair time on the effected heat exchanger. This method is applicable to Input/Loss methods of monitoring fossil-fired thermal systems.

43 Claims, 4 Drawing Sheets

OTHER PUBLICATIONS

D.F. Shanno and K.H. Phua, "Remarks on Algorithm 500, Minimization of Unconstrained Multivariate Functions", ACM Transactions on Mathematical Software, vol 6, No 2, Dec. 1980, pp 618–622.

W.L. Goffe, G.D. Ferrier and J Rogers, "Global optimization of Statistical Functions with Simulated Annealing", Journal of Econometrics, vol 60, No 1/2, Jan./Feb. 1994, pp. 65–100.

A. Corana, M. Marchesi, C. Martin and S. Ridella, "Miniminizing Multimodal Functions of Continuous Variables with the 'Simulated Annealing' Algorithm", ACM Transactions on Mathematical Software, vol 13, No 3, Sep. 1987, pp 262–280.

F. James, "A Review of Pseudorandom Number Generators", Computer Physics Communications, vol 60, 1190, pp 329–344, 1990.

W.H. Press, S.A. Teukolsky, W.T. Vettering and B.P. Flannery, 'Numerical Recipes in FORTRAN 77, The Art of Computing', Cambridge University Press, Cambridge and New York (1992), Chapter 9.6 on Newton–Raphson Method for Nonlinear.

Systems of Equations and Chapter 9.7 on Globally Convergent Methods for Nonlinear Systems of Equations.

Chapter 18, "Failure Analysis and In–Service Experience—Fossil Boilers and Other Heat Transfer Surfaces" of The ASME Handbook on Water Technology for Thermal Power Systems, P. Cohen, Editor, The American SOciety of Mechanical Engineers, New York, NY, 1989.

* cited by examiner

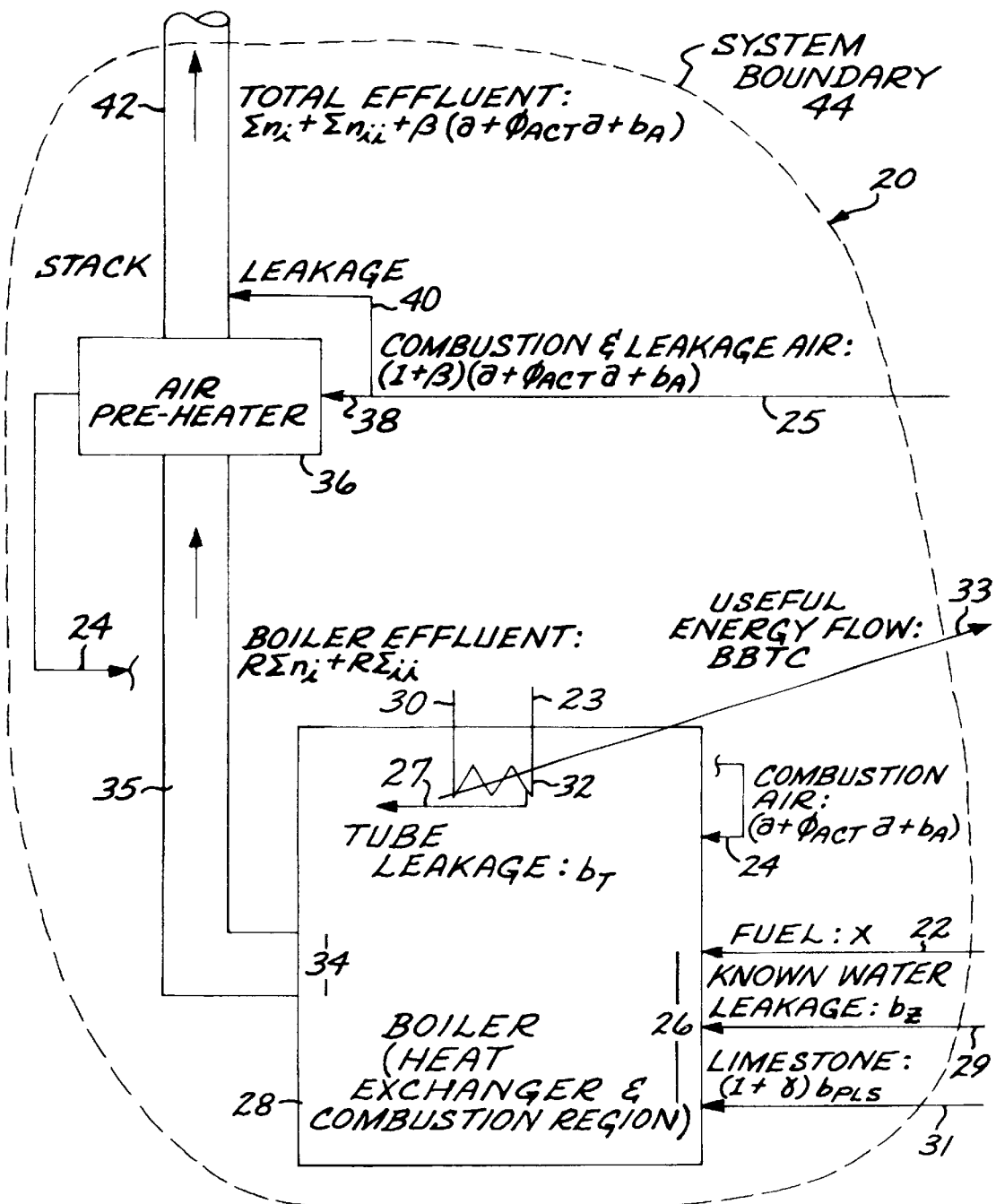

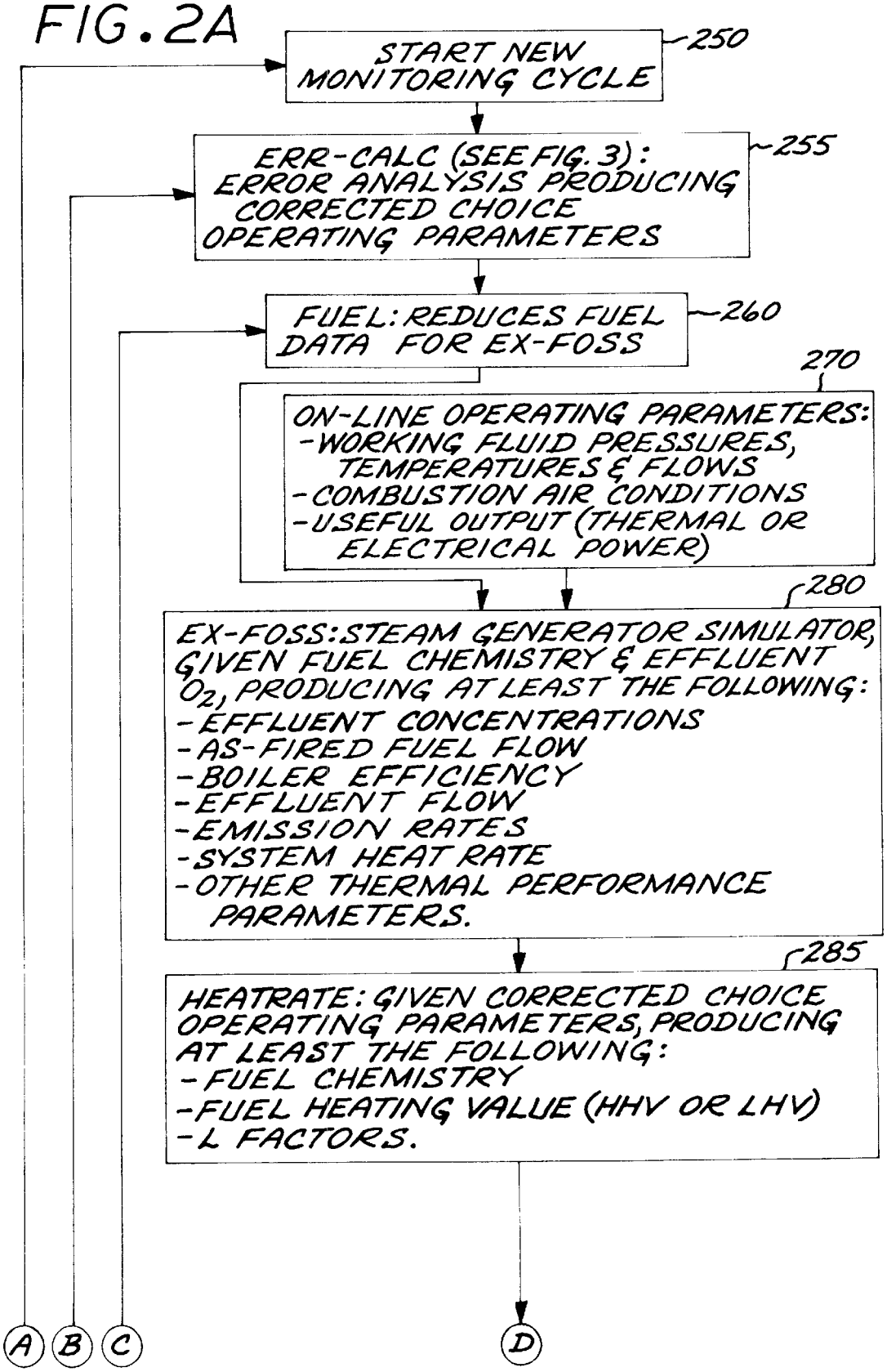

METHOD FOR DETECTING HEAT EXCHANGER TUBE FAILURES AND THEIR LOCATION WHEN USING INPUT/LOSS PERFORMANCE MONITORING OF A POWER PLANT This application is a Continuation-In-Part of pending U.S. patent application Ser. No. 10/131,932 filed Apr. 24, 2002, for which priority is claimed and is incorporated herein by reference in its entirety. application Ser. No. 10/131,932 which, in turn, is a Continuation-In-Part of U.S. patent application Ser. No. 09/273,711 filed Mar. 22, 1999 now U.S. Pat. No. 6,522,994 and is incorporated herein by reference in its entirety; application Ser. No. 09/273,711 which, in turn, is a Continuation-In-Part of U.S. patent application Ser. No. 09/047,198 filed Mar. 24, 1998 now abandoned.

application Ser, No. 10/131,932 is also a Continuation-In-Part of pending U.S. patent application Ser. No. 09/630,853 filed Aug. 2, 2000 and is incorporated herein by reference in its entirety; application Ser. No. 09/630,853 claims the benefit of U.S. Provisional Patent Application Serial No. 60/147,717 filed Aug. 6, 1999.

application Ser. No. 10/131,932 is also a Continuation-In-Part of pending U.S. patent application Ser. No. 10/087, 879 filed Mar. 1, 2002 and is incorporated herein by reference in its entirety; application Ser. No. 10/087,879 which, in turn, is a Continuation-In-Part of pending U.S. patent application Ser. No. 09/273,711 filed Mar. 22, 1999 and is incorporated herein by reference in its entirety; application Ser. No. 09/273,711 which, in turn, is a Continuation-In-Part of U.S. patent application Ser. No. 09/047,198 filed Mar. 24, 1998. application Ser. No. 10/087,879 is also a Continuation-In-Part of pending U.S. patent application Ser. No. 09/630,853 filed Aug. 2, 2000 and is incorporated herein by reference in its entirety; application Ser. No. 09/630,853 claims the benefit of U.S. Provisional Patent Application Serial No. 60/147,717 filed Aug. 6, 1999. application Ser. No. 10/087,879 is(also a Continuation-In-Part of pending U.S. patent application Ser. No. 09/827,956 filed Apr. 4, 2001 and is incorporated herein by reference in its entirety; application Ser. No. 09/827,956 which, in turn, is a Continuation-In-Part of U.S. patent application Ser. No. 09/759,061 filed Jan. 11, 2001; application Ser. No. 09/759, 061 which, in turn, is a Continuation-In-Part of pending U.S. patent application Ser. No. 09/273,711 filed Mar. 22, 1999 and is incorporated herein by reference in its entirety; application Ser. No. 09/273,711 which, in turn, is a Continuation-In-Part of U.S. patent application Ser. No. 09/047,198 filed Mar. 24, 1998. application Ser. No. 10/087, 879 is also a Continuation-In-Part of pending U.S. patent application Ser. No. 09/971,527 filed Oct. 5, 2001; application Ser. No. 09/971,527 which, in turn, is a Continuation-In-Part of pending U.S. patent application Ser. No. 09/273, 711 filed Mar. 22, 1999, and is incorporated herein by reference in its entirety; application Ser. No. 09/273,711 which, in turn, is a Continuation-In-Part of U.S. patent application Ser. No. 09/047,198 filed Mar. 24, 1998; application Ser. No. 09/971,527 is also a Continuation-In-Part of pending U.S. patent application Ser. No. 09/630,853 filed Aug. 2, 2000, and is incorporated herein by reference in its entirety; application Ser. No. 09/971,527 is also a Continuation-In-Part of pending U.S. patent application Ser. No. 09/827,956 filed Apr. 4, 2001; application Ser. No. 09/827,956 which, in turn, is a Continuation-In-Part of U.S. patent application Ser. No. 09/759,061 filed Jan. 11, 2001; application Ser. No. 09/759,061 which, in turn, is a Continuation-In-Part of pending U.S. patent application Ser. No. 09/273,711 filed Mar. 22, 1999, and is incorporated herein by reference in its entirety; application Ser. No. 09/273,711 which, in turn, is a Continuation-In-Part of U.S. patent application Ser. No. 09/047,198 filed Mar. 24, 1998.

This invention relates to a fossil-fired thermal system such as a power plant or steam generator consisting of one or more heat exchangers each constructed of heat exchanger tubes which confine the systems' working fluid, fluid being heated by the products of combustion, and, more particularly, to a method for rapid detection of tube failures when they occur and the location of the heat exchanger having the tube failure, without need for direct instrumentation, thereby preventing more serious damage and minimizing repair time on the effected heat exchanger.

BACKGROUND OF THE INVENTION

Although especially applicable to "The Input/Loss Method" as installed at coal-fired power plants, this invention may be applied to any on-line monitoring method and any other of the "Input/Loss methods", installed at any thermal system burning a fossil fuel. Such monitoring is assumed to be conducted in a continuous manner (i.e., on-line), processing one monitoring cycle after another, each cycle includes determining stoichiometric balances of the combustion process and, specifically, the fuel's heating value. Specifically, The Input/Loss Method and its associated technologies are described in the following U.S. patent applications Ser. No. 10/131,932 (hereinafter termed '932), Ser. No. 09/273,711 (hereinafter termed '711), Ser. No. 09/630,853 (hereinafter termed '853), and Ser. No. 10/087, 879 (hereinafter termed '879); and in their related provisional patent applications and Continuation-In-Parts. One of the Input/Loss methods, a rudimentary method, is described in U.S. Pat. No. 5,367,470 issued Nov. 22, 1994 (hereinafter termed '470), and in U.S. Pat. No. 5,790,420 issued Aug. 4, 1998 (hereinafter termed '420).

Large fossil-fired thermal systems, and especially coal-fired power plants, having large heat exchangers, are prone to tube leaks of their working fluid (typically water as liquid or steam). These tube leaks represent a potential for serious physical damage to heat exchangers due to pipe whip (i.e., mechanical movement) and/or steam cutting of metal given high leakages flowing at critical velocities. In a modern steam generating system, pressures of the working fluid commonly exceed 2300 psia; for a super-critical system, pressures of 3300 psia are not uncommon. Given failure of a heat exchanger tube, such fluid will experience many times critical pressure ratio as it expands into the combustion gases; that is, mixing with the products of combustion at essentially atmospheric pressure. When undetected, the damage from such tube failures may range from $2 to $10 million/leak forcing the system down for major repairs lasting up to a week. If detected early, tube failures may be repaired before catastrophic damage, such repairs lasting only several days and costing a fraction of the cost associated with late detection and catastrophic damage. Repair times may be further reduced if the location of the heat exchanger which has the leak is identified before repairs are initiated.

Tube failures in large steam generators are typically caused by one the following general categories:
Metallurgical damage caused by hydrogen absorption in the metal resulting in either embrittlement or the formation of non-protective magnetite;
Caustic gouging caused by the presence of free hydroxide in the water;

Corrosion-fatigue damage caused from the water-side of the tube, compounded by stress;

Corrosion damage caused by impacts from solid ash particles;

Fatigue failure caused by oxidation and/or mechanical movement, compounded by stress;

Overheating (e.g., from tube blockage) causing local creep; and

Physical damage from steam cutting and/or mechanical movement associated with another failed tube in the same local.

Commonly, the physical leak initiates as a relatively small penetration, although initial breaks may also occur. For reference and further discussion see: Chapter 18, "Failure Analysis and In-Service Experience—Fossil Boilers and Other Heat Transfer Surfaces" of *The ASME Handbook on Water Technology for Thermal Power Systems*, P. Cohen, Editor, The American Society of Mechanical Engineers, New York, N.Y., 1989.

Present industrial art has practiced the detection of tube failures by either: acoustic monitoring devices; through water balance testing; or through the monitoring of effluent water using instrumentation mounted in the "smoke Stack". Acoustic devices detect the unique noise created by fluids at high velocities. However, acoustic devices rarely work in large steam generators, are expensive and require benchmarking with known acoustical signatures. Water balance testing may be conducted periodically on the entire system through which large water losses due to tube failures might be discovered. However, water balance testing is expensive, insensitive to small leaks, and typically may not be conducted at sufficient frequency to prevent serious damage. The use of an effluent water instrument has been shown to be sensitive to tube failures. However, effluent water instrumentation may not differentiate between originating sources of water (e.g., between high humidity in the combustion air, or high fuel water, or a tube leakage). In practice all known methods suffer serious short-comings and are not reliable in detecting early tube failures.

The patents '470 and '420 make no mention of heat exchanger tube failures nor their detection. Although the technologies of Applications '711 and '853 support this invention, they make no mention of tube failures, their detection nor their location. Applications '932 and '879 support this invention directly. Although the methods of '932 and '879 are useful, the present invention further improves these methods. There is no established art related to this invention; there is clear need for early detection of tube failures and their location within fossil-fired systems.

SUMMARY OF THE INVENTION

This invention relates to a fossil-fired thermal system such as a power plant or steam generator, and, more particularly, to a method for rapid detection of tube failures and their location, without direct instrumentation, thereby preventing serious damage and minimizing repair time on the effected heat exchanger. Tube failures are detected through use of combustion stoichiometrics, in combination with an ability to correct effluent data through use of optimization procedures. The location of the failure within a steam generator is determined through use of energy balances, and iterative techniques. Further, this invention teaches how the stoichiometric mechanism of tube failure may be identified and reported to the system operator. This invention addresses the deficiencies found in all present detection methods.

Effluent water concentration (at the Stack) may consist of any one or all of the following sources of working fluid (assuming the working fluid is water): heat exchanger tube leaks; water added at the point of combustion (e.g., steam used to atomize fuel); pollutant control processes resulting in the in-flow of water; and/or soot blowing processes using water to clean heat exchanger surfaces (typically used in coal-fired systems). These sources of working fluid are in addition to: water formed from the combustion of hydrocarbon fuels; free water born by the fuel; and moisture carried by combustion air including air leakage. All such sources of effluent water are addressed by this invention through combustion stoichiometrics in combination with an ability to correct effluent data through use of optimization procedures.

This invention adds to the technology associated with Input/Loss methods. Specifically The Input/Loss Method has been applied through computer software, installable on a personal computer termed a "Calculational Engine", and has been demonstrated as being highly useful to power plant engineers. The Calculational Engine receives data from the system's data acquisition devices. The Calculational Engine's software consists of the EX-FOSS, FUEL and HEATRATE programs described in '711, and in FIG. 2 herein, and the ERR-CALC program described in '932 and '879, and in FIG. 3 herein. ERR-CALC now incorporates the teachings of this invention. The Calculational Engine continuously monitors system heat rate on-line, i.e., in essentially real-time, as long as the thermal system is burning fuel. The application of this invention to The Input/Loss Method as taught in '711 and installed as part of the Calculational Engine significantly enhances the power plant engineer's ability to predict tube failures and reduce outage time required for repair.

The present invention provides a procedure for determining tube leaks in a fossil-fired thermal system such as a power plant or steam generator, using combustion stoichiometrics in combination with an ability to correct effluent data such that consistent fuel chemistry is computed.

The present invention teaches the mechanism of how a tube failure has been detected stoichiometrically, such detection being important to the system operator. Also, the present invention teaches how the location of a failed tube may be determined.

Other objects and advantages of the present invention will become apparent when its general methods are considered in conjunction with the accompanying drawings and the related inventions of '932, '711, '853 and '879.

This invention has been reduced to practice and installed for demonstration at two power plants to determine the operability and functionality of this invention. These demonstrations have produced outstanding results demonstrating several identified tube failures.

BRIEF DESCRIPTION OF THE DRAWINGS

FIG. 1 is a schematic representation of a fossil-fired thermal system illustrating the application of stoichiometric relationships, and also contains definitions of terms used herein.

FIGS. 2A and 2B is a block diagram of the general interactions and functions of the computer programs ERR-CALC, FUEL, EX-FOSS and HEATRATE used to implement this invention; herein collectively referred to as FIG. 2. FIG. 2 illustrates the "Fuel Iterations" involving FUEL, EX-FOSS and HEATRATE.

FIG. 2 and FIG. 3 relate the interactions of the computer programs which implement this invention. The majority of the teachings of this invention are implemented in the ERR-CALC program. The FUEL, EX-FOSS and HEATRATE programs remain substantially unchanged as are used to implement the teachings of '932, '711, '853 and '879. However the FUEL, EX-FOSS and HEATRATE programs employ the results from ERR-CALC, including its calculated tube leakage flow rate, and thus assess the impact of such leakage on the thermal system in terms of boiler efficiency, fuel flow and system heat rate. Further, through energy balances on the steam generator's working fluid, and use of iterative procedures involving these programs, determination may be made of which heat exchanger within the steam generator contains the failed tube.

DESCRIPTION OF THE PREFERRED EMBODIMENT

Figure 2B:
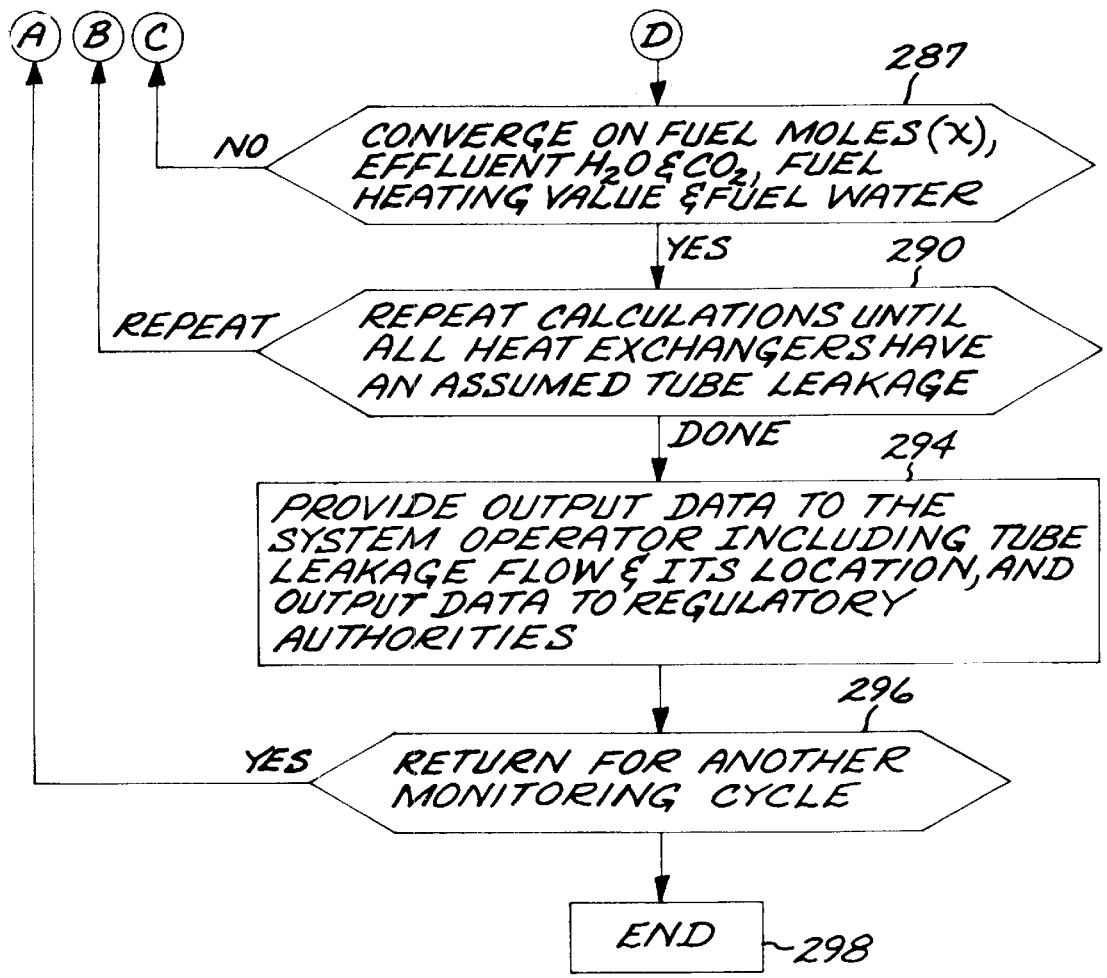

To assure an appropriate teaching of this invention, its description is divided by sub-sections. The first presents nomenclature, definitions of equation terms, typical units of measure, and meaning of terms used herein (such as Choice Operating Parameters and System Effect Parameters). The next sub-sections present an introduction, specific tube failure detection methods, the use and understanding of multidimensional minimization techniques, and then details of computational procedures. Teachings of multidimensional minimization techniques, as directly applicable to this invention are presented in '932 and '879. A sub-section also teaches how the heat exchanger containing the failed tube may be identified. The present invention expands the utility of Input/Loss methods, and specifically builds upon and expands the utility of The Input/Loss Method described in '711, '853 and '879 and related provisional patent applications and Continuation-In-Parts.

Definitions of Equation Terms With Typical Units of Measure

Stoichiometric Terms:

a=Molar fraction of combustion $O_2$ input to the system; moles/base.

aβ=$O_2$ entering with system air leakage (typically via the air pre-heater); mole/base.

$a_{Dry-theor}$=Molar fraction of combustion $O_2$ input to the system required for theoretical combustion associated with Dry (water free) fuel; moles/base.

$A_{Act}$=Concentration of $O_2$ in combustion air local to (and entering) the system; molar ratio.

$b_A$=Moisture in the entering combustion air; moles/base.

$b_A$β=Moisture entering with system air leakage; mole/base.

$b_T$=Tube leakage molar fraction; that is, water in-leakage $m_T$ entering the combustion gas path from leaks in heat exchangers; moles/base.

$b_Z$=Known water in-leakage entering and mixing with the combustion gases not related to leaks in heat exchangers; moles/base.

$b_{PLS}$=Fraction of Pure LimeStone ($CaCO_3$) required for zero CaO production; moles/base.

$d_{Act}$=Total effluent $CO_2$ at the system's boundary (i.e., Stack); moles/base.

$g_{act}$=Effluent $O_2$ at the system's boundary, without system air leakage; moles/base.

$G_{Act}$=Total effluent oxygen at the system's boundary ($g_{Act}$+aβ); moles/base.

$j_{Act}$=Effluent water at the system's boundary, without moist air leakage; moles/base.

$J_{Act}$=Total effluent water at the system's boundary ($j_{Act}$+$b_A$β); moles/base.

$J_{theor}$=Total effluent water at the boundary based on theoretical combustion; moles/base.

$n_i$=Molar quantities of dry gas products of combustion at the system boundary without air leakage; specifically those products associated with the following quantities: $d_{Act}$, $g_{Act}$, h, $k_{Act, eAct}$, f, l, m, p, q, t and u; see FIG. 1; moles/base.

$n_{ii}$=Molar quantities of non-gas products of combustion at the system boundary without moisture associated with air leakage, specifically those products associated with the following quantities: $j_{Act}$, $xα_{10}$, $σb_{PLS}$, $(1-σ+γ)b_{PLS}$ and v; see FIG. 1; moles/base.

$N_k$=Molecular weight of compound k.

$R_{Act}$=Ratio of moles of dry gas from the combustion process before entering the air pre-heater to gas leaving, defined as the Air Pre-Heater Leakage Factor; molar ratio.

x=Moles of As-fired fuel required for 100 moles of dry gas product; note: $Σn_i$=100 moles of dry gas product at the Stack is the assumed calculational base; moles/base.

$x_{theor}$=Moles of As-Fired fuel associated with theoretical combustion; moles/base.

$x_{Dry-theor}$=Moles of Dry fuel associated with theoretical combustion; moles/base.

$x_{MAF-theor}$=Moles of Moisture-Ash-Free fuel associated with theoretical combustion; moles/base.

z=Moles of $H_2O$ per effluent $CaSO_4$ based on laboratory tests; molar ratio.

$α_k$=As-Fired (wet-base) fuel chemistry constituent k per mole of fuel, where: $Σα_k$=1.0; k=0,1,2, . . . 10; see Eq.(19B) herein for terms; mole/mole-fuel.

$α_{MAF-k}$=Moisture-Ash-Free (MAF) fuel constituent k per mole of MAF fuel: $Σα_{MAF-k}$=1.0, where k=0,1,3,4,5, 6,7,8,9; see Eq.(19B) herein for terms; mole/mole-fuel.

β=Air Pre-Heater Dilution Factor (ratio of air leakage to true combustion air); molar ratio β=$(R_{Act}-1.0)/[a\ R_{Act}\ (1.0+φ_{Act})]$ γ=Molar ratio of excess $CaCO_3$ to its stoichiometric requirements (e.g., γ=0.0 if no CaO is found in the effluent); molar ratio.

σ=Kronecker function: unity if sulfur is present in the fuel, otherwise zero; unitless.

$φ_{Act}$=Ratio of non-oxygen gases ($N_2$ and Ar) to oxygen in the combustion air; molar ratio.

$φ_{Act}$=$(1.0-A_{Act})/A_{Act}$ $φ_{Ref}$=Reference ratio of non-oxygen gases (principally $N_2$ and Ar) to oxygen in the combustion air, taken as 3.7737245; molar ratio.

Multidimensional Minimization Terms:

$F(\vec{x})$=Objective function, a functional relationship using the independent variables $\vec{x}$; unitless.

f( )=>Indicates a general functional relationship; for example, the expression:

$HHV_{k3}$=f [fuel chemistry($\vec{Λ}$)], means that $HHV_{k3}$ is a function of fuel chemistry (which in-turn is a function of the vector $\vec{Λ}$).

$C_i$=Correction factor to be applied to initial Choice Operating Parameter i; unitless.

$HHV_{k3}$=Higher heating value as used by the minimization techniques as a System Effect Parameter, here subscript k3 refers to either an As-Fired, Dry or MAF heating value; Btu/lbm$_{AF}$, Btu/lbm$_{Dry}$ or Btu/lbm$_{MAF}$.

$HHV_{k3-Ref}$=Higher heating value used as a Reference System Effect Parameter; Btu/lbm$_{AF}$, Btu/lbm$_{Dry}$ or Btu/lbm$_{MAF}$.

$J_0$=Bessel function of the first kind of order zero.

$J_1$=Bessel function of the first kind of order one.

$L'_{Fuel}$=L Factor as used by the minimization techniques as a System Effect Parameter; lbm-effluent/million-Btu$_{Fuel}$.

$L'_{Fuel-Ref}$=L Factor used as a Reference System Effect Parameter; lbm-effluent/million-Btu$_{Fuel}$.

$m_{AF}$=Fuel flow rate, an As-Fired mass flow quantity (i.e., wet with water and fuel mineral matter), as may be computed by Input/Loss methods; also may be used by minimization techniques as a System Effect Parameter; lbm$_{AF}$/hour.

$m_{AF-PLT}$=The system's measured fuel flow, an As-Fired quantity (i.e., wet with water and fuel mineral matter), also termed the system's "indicated fuel flow"; also may be used as a Reference System Effect Parameter; lbm$_{AF}$/hour.

$m_T$=Tube leakage flow rate; i.e., mass flow rate of water in-leakage entering the combustion gas path from leaks in a heat exchanger, a Choice Operating Parameter; lbm/hour.

$M_L$=Dilution Factor applied to System Effect Parameter $L_{k1}$; $M_L \geq 1.0$; unitless.

$M_W$=Dilution Factor applied to System Effect Parameter $m_{AF}$; $M_W > 0.0$; unitless.

$M_H$=Dilution Factor applied to System Effect Parameter $HHV_{k3}$; $M_H \geq 1.0$; unitless.

$M_T$=Dilution Factor applied to System Effect Parameter $WF_{H2O}$; $M_T > 0.0$; unitless.

$S_i$=Scaling factor for the independent variable $x_i$; reciprocal units of measure of $\Lambda_i$.

$s_i$=Pre-scaling factor used to adjust $S_i$; unitless.

$WF_{H2O}$=As-Fired fuel water mass fraction used as a System Effect Parameter; fraction.

$WF_{H2O-Ref}$=Reference As-Fired fuel water mass fraction used by the minimization techniques as a Reference System Effect Parameter; fraction.

$\vec{x}$ =Vector of independent variables, $\vec{x}$ =($x_1, x_2, X_3, \ldots$), as based on scaled Choice Operating Parameters (not to be confused with the term for moles of As-fired fuel, x); unitless.

$\Lambda_i$=Choice Operating Parameter i, see the specific parameter for units of measure, and Eqs.(11S) through (18) for definitions.

$\vec{\Lambda}$=Vector of Choice Operating Parameters, which is user selected; for example, one selection might include: $\vec{\Lambda}$=($\Lambda_{1S}, \Lambda_{2S}, \Lambda_3, \Lambda_6, \Lambda_{7B}$); see Eqs.(11S) thru (18).

$\Lambda_{0-i}$=Initial Choice Operating Parameter i, before application of a minimization technique and based on the system's raw instrumentation signal, a previous converged solution, an estimate, and/or as otherwise determined.

$\Lambda_{F-i}$=Converged (final) Choice Operating Parameter i, after application of a minimization technique to $\Lambda_{0-i}$, and, thus corrected, applicable to all system thermal analyses.

Quantities Related to System Terms:

AF=Air/Fuel ratio defined by the mass flow rate of air entering the combustion process and $m_{AF-PLT}$; unitless mass ratio.

BBTC=Energy flow to the working fluid (without tube leakage) from combustion gases; Btu/hr.

$m_T \Delta h$=Energy flow of tube leakage; $\Delta h$ is the enthalpy difference between the last heat exchanger effected by the leakage and the first exchanger (the one initiating the leak); Btu/hr.

HBC=Firing Correction; Btu/lbm$_{AF}$.

HHVP=As-Fired higher heating value, based on HHF$_{AF}$ and used in system evaluations as corrected for a constant pressure process; Btu/lbm$_{AF}$.

HR=System heat rate (HHV-based), also termed unit heat rate; Btu/kWh. $\equiv 3412.1416/\eta_{System}$ $m_{LS}$=The system's "indicated limestone flow"; lbm/hour.

$W_{output}$=Gross power generated from a power plant; kWe.

$\eta_{B-HHV}$=Boiler efficiency (HHV-based); unitless.

Subscripts and Abbreviations:

Act=Actual value determined from the operating thermal system.

AF=As-Fired fuel at the thermodynamic boundary (i.e., wet with water and mineral matter).

Dry=Dry chemical base (i.e., free of water).

MAF=Moisture-Ash-Free chemical base (i.e., free of water and free of mineral matter).

Ref=Reference value.

PLS=Pure limestone, $CaCO_3$.

T=Tube failure associated with a heat exchanger leakage.

theor=Refers to conditions associated with theoretical combustion.

YR & ZR=Carbon & hydrogen molecular composition of gaseous hydrocarbon fuel $\alpha_0$.

YP1 & ZP1=Carbon & hydrogen molecular composition of effluent hydrocarbon t.

YP2 & ZP2=Carbon & hydrogen molecular composition of effluent hydrocarbon u.

Meaning of Terms

As used herein, the meaning of the words "Operating Parameters" refers in general to common data obtained from a thermal system applicable to the thermodynamic understanding of that system. The following quantities are included in the definition of Operating Parameters, they are not encompassing but considered typical of a minimum set of data required for thermodynamic understanding. Effluent $CO_2$, $O_2$, and $SO_2$ concentrations are determined at the Stack, or before the air pre-heater (Boiler side of the air pre-heater). The mass, wet-base ratio of the indicated combustion air flow at the system's fuel combustors, to the system's indicated fuel flow, termed $AF_{Act}$ may be required; measurements made on a volume base, or a dry-base, then converted to a mass, wet-base. Effluent $H_2O$ concentration measurement is required, or assumptions made (or as otherwise may be determined). Effluent temperature measurement is required, that is the average temperature associated with the combustion gases at the system boundary (caution must be exercised in measuring non-stratified gas flows). The inlet/outlet ratio of $CO_2$ (preferred), CO, or $O_2$ across the air pre-heater (these could be obtained off-line, based on periodic testing or judgement) is required, whose measurement is used for the determination of air pre-heater leakage using the $R_{Act}$ and $\beta$ terms. Determination of fuel temperature at an appropriate system boundary is required. Air psychrometric measurements are required, or as otherwise determined, at the system boundary (e.g., dry and wet bulb temperatures, or dry bulb and relative humidity, or dry bulb and dew point temperatures). Quantities comprising the system's Firing Corrections, HBC, should be determined. The discharge temperatures of the air as it exits each air heating or cooling device (but before it reacts with the fuel) are required; for example, such devices might include the air pre-heater, forced-draft fan, steam-to-air heater, etc. Measurements are required to determine the total energy flow deposition to the working fluid from the combustion gases (in typical units of measure of Btu/hr). For a power plant, such measurements typically include feedwater flow to the steam generator, feedwater pressure and temperature, determination of the steam flow from the steam generator if different than the feedwater flow, steam pressure, steam temperature or quality (or assumed quality), and, if applicable, reheat flows, and reheat inlet and, outlet pressures and temperatures. For a conventional power plant, determination of accurate reheat flows generally requires understanding of steam turbine flow distributions (involving high pressure turbine shaft seals, steam flows to feedwater heaters, turbine bypass leakages, attemperation spray flows and the like). The total energy flow (BBT-$m_T\Delta h$) includes the effects of tube leakage flow rate, determined by this invention, as assigned to a particular heat exchanger. Specifically, when having determined there is a tube leak, leaking heat exchanger's outlet flow of working fluid is reduced by the tube leakage flow rate, thus reducing BBTC.

As used herein, the meaning of the words "Choice Operating Parameters" refers to a sub-set of Operating Parameters with additional but related terms. Choice Operating Parameters are directly applicable to this invention as parameters which may be optimized, that is the process in which errors in these parameters are reduced by application of correction factors. These parameters are selected by the user of this invention from an available set. In the preferred embodiment, the available set of Choice Operating Parameters is herein defined as being the following eight: 1) effluent $CO_2$ concentration measured at the Stack or Boiler; 2) $H_2O$ concentration measured, or as otherwise may be determined, at the Stack or Boiler; 3) the mass, wet-base ratio of the indicated combustion air flow at the system's fuel combustors, to the system's indicated fuel flow, termed $AF_{Act}$; 4) the Air Pre-Heater Leakage Factor, termed $R_{Act}$; 5) the concentration of $O_2$ in the combustion air local to the system, or as otherwise determined, termed $A_{Act}$ (leading to the determination of $\phi_{Act}$); 6) the system's indicated limestone mass flow rate, termed $m_{LS}$; 7) effluent $O_2$ concentration measured at the Stack or Boiler; and 8) mass flow rate associated with a heat exchanger tube leakage flow rate, termed $m_T$.

As used herein, the meaning of the words "Reference Fuel Characteristics" includes an average or typical fuel chemistry and associated MAF heating value, preferably based on historical data collections of ultimate analyses of the fuel's elementary composition, with fuel water and fuel ash (typically reported as weight fractions summing to unity, leading to $\alpha_k$ molar fractions), herein termed fuel chemistry constituents. Reference Fuel Characteristics also include a MAF hydrogen versus MAF carbon relationship, that is an established functional relationship based on historical data; and in like manner MAF oxygen versus MAF carbon, MAF nitrogen versus MAF carbon, and MAF sulfur versus MAF carbon. The computed value of $L'_{Fuel-Ref}$ is included as a portion of the Reference Fuel Characteristics, computed using the reference fuel chemistry. Reference Fuel Characteristics also includes whether the variability of fuel water and fuel ash fractions in the As-Fired condition is predictable, or not. For any given fuel: fuel water may be held constant (including zero); fuel ash may be held constant (including zero); a functionality may be observed for either or both (for example, $\alpha_{MAF-10}$=f($HHV_{MAF}$); and/or fuel water and/or fuel ash may be treated as unknowns). All of these possible variations for the treatment of fuel water and ash are included as a portion of the Reference Fuel Characteristics. Reference Fuel Characteristics also contain fitting constants associated with all correlations relating dependent fuel quantities to System Effect Parameters. When applying the preferred embodiment this invention, Reference Fuel Characteristics also contain reasonability limits (i.e., numerical minimum and maximum limits) of the following: computed fuel elementary constituents, fuel water fraction and fuel ash fraction; and correction factors being applied to initial Choice Operating Parameters. Such minimum and maximum limits are preferably based on engineering judgement supported by historical data collections of ultimate analyses of the fuel, historical experience of instrumentation on which the selected Choice Operating Parameters are based, and historical records of computed correction factors to the initial Choice Operating Parameters, termed $\Lambda_{0-i}$.

As used herein, the meaning of the words "System Effect Parameters" refers to certain parameters of the thermal system and its fuel whose functionalities impact the determination of system heat rate as may be evaluated by Input/Loss methods; said functionalities dependent on at least a selection of Choice Operating Parameters. For the preferred embodiment, System Effect Parameters include the following four quantities: the L Factor ($L'_{Fuel}$); the computed As-Fired fuel flow ($m_{AF}$); the higher heating value ($HHV_{k3}$); and the As-Fired fuel water faction ($WF_{H2O}$). "Reference System Effect Parameters" are constant and targeted (i.e., desired) System Effect Parameters to which the System Effect Parameters are numerically driven by the minimization techniques through optimizing a selection of Choice Operating Parameters.

As used herein, the meaning of the words "Input/Loss methods" refers to any method or combination of methods in which one or more of the following parameters is determined based on a selection of Choice Operating Parameters, and Operating Parameters: fuel flow, effluent flow, emission rates, fuel heating value, boiler efficiency, and/or system heat rate. In addition to '932, '711, '853 and '879 and their related provisional patent applications and Continuation-In-Parts, Input/Loss methods include the methods of '470 and '420. The words "The Input/Loss Method" refers specifically to the collection of technologies described in '711, '853 and '879, and their related provisional patent applications and Continuation-In-Parts.

As used herein, the words "Calculational Engine" refers to a computer in which software descriptive of The Input/Loss Method is installed.

As used herein, if used, the words "obtain", "obtained", "obtaining", "determine", "determined", "determining", "determination", "establish", "established" or "establishing" are defined as measuring, calculating, computing, assuming, estimating or gathering from a database.

As used herein, the words "monitoring" or "monitored" are meant to encompass both on-line monitoring (i.e., processing system data in real time) and off-line monitoring (i.e., computations involving static data). A "monitoring cycle" is meant one execution of the processes described in FIG. 2, which encompasses FIG. 3.

As used herein, the meaning of the words "smoke Stack" or "Stack" or "system boundary" are defined as the physical boundary of the thermal system where gaseous combustion effluents exit, entering the local environment; refer to 42 in FIG. 1, further discussed within THE DRAWINGS. Solid effluents not leaving the Stack (e.g, ash from ash removal equipment) are referenced to the generic system's boundary 44 in FIG. 1.

As used herein, the meaning of the words "Boiler" or "Boiler Effluent" are defined as the region 35 in FIG. 1, or generically between the physical exit of the system's region 34 in FIG. 1 and entrance to its air pre-heater 36 in FIG. 1; see THE DRAWINGS.

As used herein, the meaning of the words "Fuel Iterations", are defined in conjunction with a detailed description of FIG. 2, found within THE DRAWINGS.

As used herein, the meaning of the word "indicated" when used in the context of data originating from the thermal system is defined as the system's actual and uncorrected measurements of a physical process (e.g., pressure, temperature, mass flow, volumetric flow, density, and the like) whose accuracy or inaccuracy is not assumed. As examples, a system's "indicated fuel flow" or its "indicated limestone flow" denote system measurements the accuracy of which is unknown (they are "as-is", with no judgement applied). Such indicated measurements are said to be either correctable or not. If not correctable, it may be the associated computed value from Input/Loss methods tracks the indicated value over time (the indicated not being corrected per se). In the case of indicated limestone flow when use as a Choice Operating Parameter ($\Lambda_6$), it is directly corrected as taught by this invention. In the case of indicated fuel flow when used as a System Effect Parameter, it may be shown that the computed fuel flow, $m_{AF}$, tracks the indicated fuel flow, $m_{AF-PLT}$, through adjustment of the Dilution Factor $M_W$.

Introduction

Any study of the combustion of fossil fuels necessitates the formulation and use of a combustion equation. Combustion equations used by Input/Loss methods are described in '470, '420 and '711 by their designated Eq.(29), in '853 by its Eq.(19), in '879 by its Eq.(19-corr), and in '932 by its Eq.(19B). This invention's methods are taught through a combustion equation defined by Eq.(19B); through which stoichiometric terms are defined, including the use of the $b_T$ term important to this invention. Eq.(19B)'s nomenclature is unique in that brackets are used for clarity: for example, the expression "$\alpha_2[H_2O]$" means the fuel moles of water, algebraically simply $\alpha_2$; the expression "$d_{Act}[CO_2]$" means the effluent moles of carbon dioxide, algebraically simply $d_{Act}$. The stoichiometric base of Eq.(19B) is 100 moles of dry Stack gas. Also, note that in combustion equations, such as Eq.(19B) describing commercial steam generators, that the assumption is typically made of possible extraneous water leakage into, and mixing with, the products of combustion. The flow of such water is assumed known (either measured or otherwise reasonably estimated), and is denoted by the symbol $b_Z$. It is common industrial practice to use this symbol, $b_Z$, to denote the quantity of steam used to atomize fuel, it may also be used to denote water used for soot blowing. Such $b_Z$ in-leakage is apart from water formed from combustion of hydrocarbon fuels, the term ($x\alpha_0 ZR/2+x\alpha_5+x\alpha_9$); apart from free water born by the fuel ($x\alpha_2$); apart from moisture carried by the combustion air ($b_A+\beta b_A$); and apart from tube leakages (the $b_T$ term).

$$x[\alpha_0[C_{YR}H_{ZR}]+\alpha_1[N_2]+\alpha_2[H_2O]+\alpha_3[O_2]+\alpha_4[C]+\alpha_5[H_2]+\alpha_6[S]+\alpha_7[CO_2]+\alpha_8[CO]+\alpha_9[H_2S]+\alpha_{10}[Ash]]_{As\text{-}Fired\ Fuel}+$$

$$b_Z[H_2O]_{In\text{-}Leakage}+[(1.0+\beta)(a[O_2]+a\phi_{Act}[N_2]+b_A[H_2O])]_{Air}+[(1.0+\gamma)b_{PLS}[CaCO_3]]_{As\text{-}Fired\ PLS}+b_T[H_2O]_{Tube\text{-}Leakage}=$$

$$d_{Act}[CO_2]+g_{Act}[O_2]+h[N_2]+j_{Act}[H_2O]+k_{Act}[SO_2]+[e_{Act}[CO]+f[H_2]+l[SO_3]+m[NO]+p[N_2O]+q[NO_2]+t[C_{YP1}]+u[C_{YP2}H_{ZP2}]]_{Minor\ Components}+$$

$$x\alpha_{10}[ash]+\sigma b_{PLS}[CaSO_4.zH_2O]+[(1.0-\sigma+\gamma)b_{PLS}[CaO]]_{Excess\ PLS}+v[C_{Refuse}]+[\beta(\alpha[O_2]+a\phi_{Act}[N_2]+b_A[H_2O])]_{Air\ Leakage} \quad (19B)$$

As taught in '879 the sensitivity of computed fuel chemistries to an effluent $H_2O$ measurement is substantial. When employing Input/Loss methods which compute fuel chemistry, fuel chemistry effects fuel heating value, boiler efficiency and thus system heat rate. With such Input/Loss methods, computed fuel chemistries are generally sensitive to the principal effluents, including $CO_2$, $H_2O$ and $O_2$. The effluent $H_2O$ measurement (or its assumption), as well as effluent $CO_2$ and $O_2$, may be corrected through methods taught by '879; however, as such measurements will be impacted by even moderate tube leaks. Further, '879 discusses the extension of its methods used to optimize certain parameters, said extensions include an assumed flow of water in-leakage into and mixing with the combustion gases, thus the monitoring of tube leaks using a combination of combustion stoichiometrics and optimization methods. Although '879 methods may be useful in certain circumstances, this invention has been demonstrated at power plants to be universally applicable.

This invention teaches to add, apart from $b_Z$, a term descriptive of tube leakage to the typical combustion equation; its symbol is $b_T$ whose units are moles of liquid water or steam in-leakage per 100 moles of dry gas product. Taught is a procedure by which the flow of in-leakage associated with a tube failure and its location may be determined. This procedure relies on a hydrogen stoichiometric balance incorporating $b_T$, applying limit tests on fuel constituents and terms related to the detection of tube failures; which tests provide an indication of possible tube failure and its stoichiometric causality (termed a "tube failure mechanism", indicated by a numerical identification termed a "trip mechanism").

Once a tube failure mechanism has been identified, a tube failure flow rate is determined, but determined using a separative analysis technique. The preferred embodiment relies on modification of the combustion equation with the $b_T$ term, it relies on limits testing, and it relies on successive optimizations of Choice Operating Parameters which minimize errors in System Effect Parameters. All of these topics are discussed in detail in the following sub-sections.

Tube Failure Detection Methods

Forming a hydrogen stoichiometric balance using Eq. (19B), and solving for $b_T$, results in the following; note the effluent moisture (at the Stack), is defined as: $J_{Act} \equiv j_{Act}+\beta b_A$. Note that Eq.(19B) represents a mathematical model of the combustion process using a molar base, whose manipulation is common art and as taught in '711. Eq.(20) allows the determination of the tube leakage in moles based on Eq.

(19B), that is the stoichiometric model of the combustion process using a molar base.

$$b_T = J_{Act} - x(\alpha_0 ZR/2 + \alpha_2 + \alpha_5) - b_Z - (b_A + \beta b_A) - x\alpha_9 + f + (ZP1)t/2 + (ZP2)u/2 + \alpha z b_{PLS} \quad (20)$$

The second line of Eq.(20) consists of minor terms, and although their presence teaches stoichiometric consistency and the generality of the process, typically for most large steam generators these terms are not applicable and may be assumed to be zero. Eq.(20) illustrates that for $b_T$ to be positive, i.e., a tube leak being detected, that unique balance must be developed between the assumed (or measured) effluent water ($J_{Act}$) and the predominating negative terms: combustion water ($x\alpha_0 ZR/2 + x\alpha_2 + x\alpha_5$), $b_Z$, and moisture in the combustion air and in the air leakage ($b_A + \beta b_A$). Eq.(20) demonstrates that use of an effluent $H_2O$ instrument, measuring $J_{Act}$, may not detect tube failures. For example, any unusual increase in $J_{Act}$ could be caused by off-setting effects from high fuel water, high moisture in the combustion air, high air pre-heater leakage (a high $\beta$) and/or periodic soot blowing flow and/or use of atomizing steam ($b_Z$). Further, a tube leak could exist when the $J_{Act}$ term is decreasing as caused, for example, by a large decrease in fuel water (when, at the same time, $b_T$ is increasing). To resolve such difficulties, this invention teaches the use of Eq.(20) in conjunction with one of the Input/Loss methods such that fuel chemistry, the $\alpha_i$ terms, may be obtained.

When Input/Loss methods compute fuel chemistry, such chemistry will include at least the determination of fuel elementary carbon ($\alpha_4$ for coal), fuel elementary hydrogen ($\alpha_5$ for coal) and fuel water ($\alpha_2$). Typical Input/Loss methods will determine such quantities, in part, based on Operating Parameters including principal effluent concentrations ($CO_2$, $O_2$ and $H_2O$), combustion air psychrometrics (leading to $b_A$), and any water and steam flows used for soot blowing and atomizing of fuel ($b_Z$). Further, The Input/Loss Method teaches, as a portion of Reference Fuel Characteristics, to obtain a correlation between moisture-ash-free (MAF) hydrogen and carbon, for example: $\alpha_{MAF-5} = A_5 + B_5 \alpha_{MAF-4}$; $\alpha_{MAF-5} = A_5 + B_5 \alpha_{MAF-4} + C_5(\alpha_{MAF-4})^2$; or $\alpha_{MAF-5} = f(\alpha_{MAF-4})$. Such functional correlations have been found to be most useful for coal fuel. Such a correlation then establishes inter-dependency between fuel carbon and all principal effluents, and thus, through Eq.(20) and resolution of Eq.(19B), between the effluent concentrations $CO_2$, $O_2$ and $H_2O$, and the important $b_T$ term. Given such inter-dependencies, it is most likely that when assuming $b_T = 0.0$, when in fact a tube is leaking, one or more fuel molar quantities ($\alpha_0$, $\alpha_1$, $\alpha_2$, . . . ) will compute outside reasonability limits or even as a negative value. Experience applying this invention has taught that fuel water will commonly compute as negative, even with a moderate leak when initially assuming $b_T = 0.0$ in Eq.(20).

In like manner, and especially for small leaks (when assuming $b_T = 0.0$), the fuel carbon and hydrogen terms could exceed reasonability limits; where, assuming that the constant $B_5$ is negative (which is typical for coals): $\alpha_{MAF-5} < \alpha_{MAF-5/min}$, and/or $\alpha_{MAF-4} > \alpha_{MAF-4/max}$. Such behavior when using Eq.(20), when first assuming $b_T = 0.0$ and then evaluating for reasonability limits, leads directly to an indication of tube leakage. This process is termed a possible tube failure mechanism, that is an indication of possible tube leakage has been found by applying stoichiometric considerations (min/max checks); further processing is called for to determine its validity and, if a valid leak, then to determine its mass flow rate and the location of the leak.

To fully expand the concept of tube failure mechanisms, TABLE 1 teaches seventeen such mechanisms, identified by a number, of how a tube failure may be detected through stoichiometrics, knowledge of such detection mechanism being important to the system operator. Experience of demonstrating this invention at two large power plants has indicated that making assumptions as to "apparently" impossible tube failure mechanisms is not advised. Thus both minimum and maximum trip mechanisms are demonstrated in TABLE 1, as all are tested when monitoring a thermal system on-line when invoking the methods of this invention (i.e., invoking the "Tube Failure Model"). For example, a cursory evaluation would suggest that a high fuel water concentration ($\alpha_{MAF-2}$ or $WF_{H2O}$) could not indicate a tube failure given the mechanics of Eq.(20). However, if the thermal system experiences a small but steadily increasing tube leakage The Input/Loss Method of '879 could steadily correct effluent water concentration upwards, causing tube failure mechanism ID #42 or #52; or water correction factors might exceed an upper bound causing tube failure mechanism ID #72. But also, unplanned scenarios of now The Input/Loss

TABLE 1

Tube Failure Mechanisms

| Mech. ID | Trip Mechanism | Comments |
|---|---|---|
| 11 | $J_{Act} < J_{Act/min}$ | Effluent $H_2O$ concentration at Stack; a minimum $J_{Act}$ is not a likely mechanism. |
| 12 | $J_{Act} > J_{Act/max}$ | Effluent $H_2O$ concentration at Stack. |
| 21 | $\alpha_{MAF-4} < \alpha_{MAF-4/min}$ | MAF molar fraction of carbon in fuel; a minimum $\alpha_{MAF-4}$ is not a likely mechanism. |
| 22 | $\alpha_{MAF-4} > \alpha_{MAF-4/max}$ | MAF molar fraction of carbon in fuel. |
| 23 | Negative square root. | Resolution of MAF carbon ($\alpha_{MAF-4}$) requires solving a second order equation, thus the possibility of tripping on a negative square root (or any mathematical indeterminate). |
| 31 | $\alpha_{MAF-5} < \alpha_{MAF-5/min}$ | MAF molar fraction of hydrogen in fuel. |
| 32 | $\alpha_{MAF-5} > \alpha_{MAF-5/max}$ | MAF molar fraction of hydrogen in fuel; a maximum $\alpha_{MAF-5}$ is not a likely mechanism. |
| 41 | $\alpha_{MAF-2} < \alpha_{MAF-2/min}$ | MAF molar fraction of water in fuel. |
| 42 | $\alpha_{MAF-2} > \alpha_{MAF-2/max}$ | MAF molar fraction of water in fuel. |
| 51 | $WF_{H2O} < WF_{H2O/min}$ | As-Fired weight fraction of water in fuel. |
| 52 | $WF_{H2O} > WF_{H2O/max}$ | As-Fired weight fraction of water in fuel. |
| 61 | $\alpha_{MAF-1} < \alpha_{MAF-1/min}$ | MAF molar fraction of nitrogen in fuel; nitrogen is computed by balance: $\alpha_{MAF-1} = 1.0 - \Sigma \alpha_{MAF-k}$, $k \neq 1$. |
| 62 | $\alpha_{MAF-1} > \alpha_{MAF-1/max}$ | MAF molar fraction of nitrogen in fuel; nitrogen is computed by balance: $\alpha_{MAF-1} = 1.0 - \Sigma \alpha_{MAF-k}$, $k \neq 1$. |
| 71 | $C_{H2O} < C_{H2O/min}$ | Correction factor for effluent $H_2O$. |
| 72 | $C_{H2O} > C_{H2O/max}$ | Correction factor for effluent $H_2O$. |
| 81 | $C_{CO2} < C_{CO2/min}$ | Correction factor for effluent $CO_2$. |
| 82 | $C_{CO2} < C_{CO2/max}$ | Correction factor for effluent $CO_2$. |

Method is correcting effluent water and other Choice Operating Parameters could create unexpected tube failure mechanisms via complex stoichiometric relationships. Such considerations thus call for a blanket examination of all trip mechanisms, which is the preferred embodiment. In extending the teachings of this invention as taught by TABLE 1, there are other tube failure mechanisms which may become apparent without departing from the scope, spirit and general industrial applicability of this invention; however, TABLE 1 encompasses the most likely of mechanisms based on the experiences gained demonstrating this invention.

It is an important aspect of this invention that it may be integrally involved with Input/Loss methods which compute fuel chemistry; that is, methods which determine fuel chemistry based on Operating Parameters. As seen with the use of TABLE 1, without a determination of fuel chemistry, i.e., computing $\alpha_i$ quantities based on consistent stoichiometrics (with or without tube leakage), then the use of Eq.(20) as taught herein to detect tube leaks would become limited. More specifically, this invention is integrally involved with The Input/Loss Method of '71 1 and '879 as the determination of fuel chemistry is then based on a selection of Choice Operating Parameters which might well require corrections for stoichiometric consistencies. For example, if effluent water was being measured, but whose signal was not corrected for stoichiometric consistency as taught in '879, resolution of tube leaks (even with computed $\alpha_i$ quantities) would be hampered; especially so if fuel chemistry was assumed constant.

Minimization Techniques, Background

The following four sub-sections teach the use of multi-dimensional minimization techniques, including the use of System Effect Parameters and Choice Operating Parameters. Taught is how their use allows resolution of flow rates associated with tube failures. Although only the Simulated Annealing technique is needed for the preferred embodiment, discussion of all techniques, including neural networks, is made to present the full spirit of this invention.

For the preferred embodiment, four multidimensional minimization techniques may be used by this invention. All techniques seek to minimize the numerical value of an objective function. These techniques include: Broyden-Fletcher-Goldfarb-Shanno (BFGS), generic Conjugate Gradient, Newton-Raphson and Simulated Annealing techniques; references cited below. These techniques, and, notably, their combinations, are designed to address all situations of bias in Choice Operating Parameters. All of these techniques, except Simulated Annealing, employ derivatives of the objective function with respect to the independent variable. These techniques all require input of initial Choice Operating Parameters ($\Lambda_{0-i}$). The BFGS, generic Conjugate Gradient and Newton-Raphson techniques employ unconstrained searches towards optima Simulated Annealing employs a random but constrained search by which the Choice Operating Parameters are numerically bounded by lower and upper limits. From research and study conducted to develop this invention, the objective functions described below have proven to be superior for a wide variety of thermal systems burning fossil fuels.

A common problem facing minimization techniques is the so-called shallow valley problem in which an appreciable change in an independent variable has a small effect on the objective function, even through that change is both real and appropriate to the physical system. This is especially true when applied to the determination of tube leakage flow rate in which a single, but small, tube failure of 15,000 lbm/hr in a large steam generator might represent less than 0.5% of the output. Study conducted for the development of this invention, and considered unique to it, has found that the Bessel function of the first kind is ideally suited to diminish the impact of the shallow valley problem. The Bessel function emulates the sensitivity that important Choice Operating Parameters have on both System Effect Parameters and on the descriptive thermal system in general. The Bessel function of the first kind of order zero ($J_0$) has a relatively flat (shallow) functionality as its argument approaches zero. Apart from this situation, the function offers non-linearity which is advantageous in converging out-lying arguments. Of great importance is that the derivative of $J_0$ is a Bessel function of the first kind of order one ($J_1$), having a high degree of sensitivity as its argument approaches zero. This derivative relationship addresses a significant number of shallow valley problems presented by Choice Operating Parameters associated with thermal systems. Another technique addressing the shallow valley problem and involving use of the Bessel function is the formulation of its argument, termed either $\lambda_L$, $\lambda_W$, $\lambda_H$ and $\lambda_T$ [i.e., $J_0(\lambda_L)$, $J_0(\lambda_W)$, $J_0(\lambda_H)$ or $J_0(\lambda_T)$]; these arguments are fully discussed below, being defined by Eqs.(2A), (2B), (2C) and (2D).

The objective function, F, is a function of independent variables $\vec{x}$; or $F(\vec{x})$. Of uniqueness to this invention, to address inter-dependencies of the Choice Operating Parameters, $x_i$ is defined as a scaled Choice Operating Parameter ($\Lambda_i$) using the scaling factor $S_i$; where, initially: $x_i \equiv S_i \Lambda_{0-i}$; further discussed above Eq.(6). By design, Choice Operating Parameters are used by The Input/Loss Method to compute certain parameters reflective of the system at large. These parameters are termed System Effect Parameters and, for the preferred embodiment, include four general types and their associated reference values: the L Factor ($L'_{Fuel}$); the As-Fired fuel flow ($m_{AF}$); the higher heating value ($HHV_{k3}$); and the As-Fired fuel water fraction ($WF_{H2O}$). The L Factor, $L'_{Fuel}$, is defined by Eq.(72A-alt). The higher heating value is chosen as either: an As-Fired value, $HHV_{AF}$; a Dry value, $HHV_{Dry}$; and/or a MAF value, $HHV_{MAF}$. As the preferred embodiment, the As-Fired fuel water fraction is selected only when determining tube leakage flow rates. However, the power plant engineer may select from any one or more or all of these System Effect Parameters (including any one or more or all of the heating values), whose differences with respect to reference values are minimized by altering the selected Choice Operating Parameters through minimization techniques. The minimization techniques are structured to minimize differences between a System Effect Parameter and its corresponding "Reference System Effect Parameter" (termed: $L'_{Fuel-Ref}$, $m_{AF-PLT}$, $HHV_{k3-Ref}$ and $WF_{H2O-Ref}$). System Effect Parameters are chosen such that they reflect influences on system heat rate through Choice Operating Parameters, and, at the same time, reflect inter-dependencies of the Choice Operating Parameters. For example: changes in the concentration of effluent $CO_2$ (defined as $\Lambda_{1S}$ or $\Lambda_{1B}$), affects computed fuel chemistry, thus affects computed heating value, and also affects computed boiler efficiency, all of which affect system heat rate; however a change in $CO_2$ may be caused by a change in the concentration of effluent $H_2O$ (defined as $\Lambda_2S$ or $\Lambda_{2B}$), or a change in the fuel ash fraction (defined through $\Lambda_3$), whose changes themselves may also affect computed fuel flow and fuel chemistry. Further, all selected Choice Operating Parameters ($\vec{\Lambda}$) must be numerically scaled (or not) appropriate to the minimization technique.

The following summarizes the objective functionalities for the preferred embodiment, demonstrating the aforementioned principles:

$$F(\vec{x}) = \Sigma_{i \in if}[S_i, J_0(\lambda_L), J_0(\lambda_W), J_0(\lambda_H), J_0(\lambda_T)]$$

$$\lambda_L = f[L'_{Fuel}, L'_{Fuel-Ref}, M_L]$$

$$\lambda_W = f[m_{AF}, m_{AF-PLT}, M_W]$$

$$\lambda_H = f[HHV_{k3}, HHV_{k3-Ref}, M_H]$$

$$\lambda_T = f[WF_{H2O}, WF_{H2O-Ref}, M_T]$$

The symbol $\Sigma_{i \in I}$ is defined following Eq.(3). Note that as $F(\vec{x})$ is minimized the quantities $\vec{\Lambda}$ are updated in turn ($\Lambda_i = x_i/S_i$), thus allowing System Effect Parameters to be computed leading directly to the computation of $\lambda_L$, $\lambda_W$, $\lambda_H$ and $\lambda_T$. The following are functionalities of the System Effect Parameters. System Effect Parameters have general dependency on Reference Fuel Characteristics, including the following important inter-relationships: computed fuel chemistry is dependent on several or all Choice Operating Parameters, $\vec{\Lambda}$; computed heating values (HHV$_{k3}$ and HHVP) are dependent on fuel chemistry, thus $\vec{\Lambda}$; and boiler efficiency ($\eta_{B-HHV}$) determined using '853 methods is dependent directly on $\Lambda_i$ effluents $CO_2$ and $O_2$, is also dependent on fuel chemistry, and is also dependent on heating value, thus $\vec{\Lambda}$. All of these quantities (fuel chemistry, heating values and boiler efficiency) are also dependent on in-leakage of working fluid into the combustion path, the terms $b_Z$ and $b_T$. Working fluid energy flow given tube leakage and Firing Correction terms, (BBTC−$m_T \Delta h$) and HBC, are dependent on Operating Parameters.

$$x_i \equiv S_i \Lambda_i$$

$$L_{k1} = f[\text{fuel chemistry}(\vec{\Lambda})]$$

$$m_{AF} = f[(BBTC - m_T \Delta h), \eta_{B-HHV}(\vec{\Lambda}), HHVP(\vec{\Lambda}), HBC]$$

$$HHV_{k3} = f[\text{fuel chemistry}(\vec{\Lambda})]$$

$$WF_{H2O} = f[\text{tube leakage flow rate, fuel chemistry}(\vec{\Lambda})].$$

System Effect Parameters

As discussed, System Effect Parameters include four general types and their associated reference values: the L Factor (L'$_{Fuel}$); the As-Fired fuel flow ($m_{AF}$); the higher heating value (HHV$_{k3}$); and the As-Fired fuel water fraction (WF$_{H2O}$). The most important of these is the L Factor, used routinely for most situations. The higher heating value may be employed, for example, when the thermal system is operating under controlled conditions (e.g., under a testing program), in which its fuel is well characterized. Also, during initial installation of a Calculational Engine, heating value may be used for scoping the range of reasonable correction factors. Fuel flow is discussed below. The As-Fired fuel water fraction is typically used for the special case of computing the tube leakage mass flow rate, $m_T$.

The L Factor is important in reducing the impact of the shallow valley problem found with fossil-fired systems. An important reason for this is that L'$_{Fuel}$ has been demonstrated to have remarkably small standard deviations for a given Rank of coal (typically±0.05%). Use of the L Factor as a System Effect Parameter is the preferred embodiment, that is when L'$_{Fuel}$ is computed using Eq.(72A-alt) or its equivalence.

$$L'_{Fuel} = 10^6 [x_{Dry-theor} N_{Dry-Fuel} + a_{Dry-theor}(1.0 + \phi_{Ref})N_{Air} - J_{theor}N_{H2O} - x_{MAF-theor}\alpha_{MAF-10}N_{Ash} - x_{MAF-theor}\alpha_{MAF-7}N_{CO2}]/(x_{theor}N_{Fuel}HHV_{AF}) \quad \text{(72A-alt)}$$

where the identity: $x_{MAF-theor}N_{MAF-Fuel}HV_{MAF} = x_{Dry-theor}N_{Dry-Fuel}HHV_{Dry} = x_{theor}N_{Fuel}HHV_{AF}$ has been found useful in determining the L Factor.

Along with the L Factor, the power plant engineer may also choose, in any combination, the plant's indicated fuel flow, the As-Fired heating value, the Dry heating value and/or the MAF heating value as System Effect Parameters.

Although the power plant engineer has complete flexibility, with this flexibility must apply common engineering judgement. For example, optimizing effluent water against HHV$_{MAF}$ or HHV$_{Dry}$ (heating values without water) would make little sense given the lack of connectivity.

Selecting the system's indicated fuel flow, $m_{AF-PLT}$, as a Reference System Effect Parameter is at odds with '470 and '420 and the teachings of '711, since inaccuracies in a measured flow of a bulk fuel, such as coal, may be appreciable. However, in developing this invention, observations at several power plants revealed that coal flow measurements may be consistent, but not necessarily accurate, reflecting changes in any number of quantities which may impact system heat rate. As such, this invention teaches that the minimization techniques may be used to minimize the difference between a computed fuel flow ($m_{AF}$) and the system's indicated fuel flow ($m_{AF-PLT}$) through converged Choice Operating Parameters. Thus, the method of this invention allows use of the system's indicated fuel flow to aid in the determination of computed fuel chemistry and fuel heating value. Although not required, for many situations it is the preferred embodiment that use of the system's fuel flow be accompanied with the L'$_{Fuel}$ factor of Eq.(72A-alt), to assist with stability and reasonableness of solution. To further enhance stability and reasonableness of solution the power plant engineer may option to limit the range of fuel concentrations determined by the methods of this invention. The engineer may also limit the numerical range of the selected Choice Operating Parameters when using the Simulated Annealing technique. Further, to address the likelihood that $m_{AF-PLT}$ is in error, a Dilution Factor ($M_W$) has been applied to the relationship between $m_{AF}$ and $m_{AF-PLT}$; see Eq.(2B) as discussed below.

In summary, the process involving the minimization of differences in System Effect Parameters, by optimizing Choice Operating Parameters, results in converged Choice Operating Parameters $\Lambda_{F-i}$. Correction factors, $C_i$, are then determined as based on the ratio of the converged Choice Operating Parameter to their initial values ($\Lambda_{0-i}$). $\Lambda_{0-i}$ are based on the system's raw instrumentation signal, a previous converged solution, an estimate, or as otherwise determined.

$$C_i \equiv \Lambda_{F-i}/\Lambda_{0-i} \quad (1)$$

Minimization Techniques, Formulations

This sub-section presents general discussions of the multidimensional minimization techniques and detailed formulations useful to the power plant engineer in minimizing errors in System Effect Parameters.

The BFGS technique represents a second generation of multidimensional minimization techniques. As such, it is considered one of the most robust of techniques for a well conditioned problem. The particular BFGS technique employed by the Calculational Engine has a superior reputation for convergence. The only input parameters the user need be concerned with are the initial relative step-length and the change in the relative step-length. A well-chosen initial relative step-length will prevent long iterations (a value of 0.100 to 0.200 is recommended). The change in the relative step-length impacts resolution of the shallow valley problem, and may be varied until proper convergence patterns are established. A value between 0.010 to 0.040 for the change in the relative step-length has been found to be satisfactory when used in conjunction with the scaling techniques taught herein. The BFGS technique is the preferred method for use on a continuous bases after the problem has been properly conditioned with scaling factors, and selections of Choice Operating and System Effect Parameters have been established. These input parameters are also applicable to the generic Conjugate Gradient technique.

The generic Conjugate Gradient technique represents a first generation of multidimensional minimization techniques. For numerical processing reasons the BFGS technique has been demonstrated to be superior in to the generic Conjugate Gradient in convergence techniques and accuracy. However, there may be situations in which a generic Conjugate Gradient may be useful as an alternative once the problem has been conditioned.

The Newton-Raphson method is one of the oldest and simplest multidimensional minimization techniques. This method requires the objective function's compounded vector gradient, resulting in a Jacobian determinant. Generally it will yield an efficient means of convergence but requires reasonable initial Choice Operating Parameters ($\Lambda_{0-i}$); however, without such reasonableness it may fail wildly. Newton-Raphson is recommended for use only after the BFGS technique has failed to meet its convergence criteria. It has applicability given its use of the Jacobian determinant, through which forming explicit inter-dependencies between System Effect Parameters and all Choice Operating Parameters are employed. This assures computed dependencies, if such dependencies exist. This intrinsic feature has been found to be of importance when resolving certain power plant problems. The preferred embodiment is to automatically default from BFGS, given failure to meet its convergence (typically due to a lack of established inter-dependencies of Choice Operating Parameters) to, first, the Newton-Raphson, and then in-turn, given its failure, to Simulated Annealing. Newton-Raphson may also be used for scoping initial installations of The Input/Loss Method given difficult combinations of System Effect and Choice Operating Parameters.

The Simulated Annealing technique, because it employs a global, constrained search methodology, is the preferred embodiment for initial study of a new Input/Loss installation and for determining tube leakage flow rate. It may also be used to assist in the selection of which Choice Operating Parameters are best for a particular thermal system. This procedure simulates the annealing process of metal, requiring the controlled reduction of a pseudo-temperature (herein termed "pseudo-T") to achieve a desired result (i.e., achieving a minimum potential energy of the metal's structure when slowly cooled, thus the minimizing of an objective function). This is a brute force approach involving random search; gradients are not used. As a global optimization procedure it may move both downhill and uphill (that is, it may move both towards and away from local optima), resulting in distinction between different local optima Conventional optimization techniques (BFGS, generic Conjugate Gradient and Newton-Raphson) only move downhill when minimizing an objective function. Conventional techniques are blind to a global solution in the sense they immediately choose the downhill direction. When addressing fossil-fired combustion problems this may lead to optimizing on the most sensitive of a given selection of Choice Operating Parameters (most likely $CO_2$, thus $\Lambda_{1S}$ or $\Lambda_{1B}$). Distinction between different local optima is accomplished by first starting with initial $\Lambda_{0-i}$ values, then successively evaluating randomly acquired changes, $\vec{\Lambda}$, but which fall within user-defined step-lengths. Initially this results in coarse study of the objective function, employing large step-lengths, requiring repeated evaluations with seemingly little progress. In the process of choosing $\vec{\Lambda}$ values the algorithm generally attempts to move downhill, however it also moves uphill in a probabilistic manner to escape local optima. Step-lengths are dynamically chosen such that half of all uphill moves are randomly accepted, again helping to ensure that the function escapes local optima. As the annealing process proceeds and the algorithm closes on the global optimum, step-lengths decrease as the pseudo-T decreases requiring even more objective function evaluations as the optimum is approached. By viewing objective functions in general terms and with its ability to move probabilistically uphill, Simulated Annealing solves functions that are otherwise difficult to resolve, including shallow valley problems associated with tube leakages. However, with such flexibility comes numerous objective function evaluations necessitating long computing times. In addition, converged solutions should be re-tested periodically with different seeds (i.e., initializations of the random number generator) to assure the global optimum.

When applied to fossil-fired combustion, the more sensitive inputs to the Simulated Annealing technique include the following: starting point $\Lambda_{0-i}$ values; the number of cycle evaluations (5 is recommended); the minimum and maximum values associated with each $\Lambda_i$ (i.e., defining the region containing the optimum); an initial pseudo-T (0.100 is recommended); and the relative change in pseudo-T (i.e., the step-length, 0.010 to 0.020 is recommended). Each of these inputs may be established by sensitivity study to assure a robust solution, or as otherwise determined. Minimum and maximum $\Lambda_i$ values may also be established by review of historical system data or through the experience of the power plant engineer. The smaller the range between minimum and maximum $\Lambda_i$ values, the tighter the search becomes with the final solution becoming narrowed. This feature is especially useful when As-Fired fuel flow or As-Fired fuel water fraction are selected as a System Effect Parameters (in combination with non-unity Dilution Factors, $M_W$ and $M_T$).

Objective Function and Choice Operating Parameters

The following paragraphs present the preferred objective functions and their solution methodologies and specify Choice Operating Parameters which may be employed by minimization techniques. As explained, the Bessel function is used to define the objective function. The Bessel function's argument, as taught by this invention, has been chosen to aid in addressing the shallow valley problem and in convergence of the minimization techniques. The formulations presented produce quantities which may allow numerical inter-dependencies between Choice Operating Parameters ($\vec{\Lambda}$), or not, depending on the Method Option chosen. This is important for addressing problems in which initial Choice Operating Parameters lie far from the optimum. This is also important where more than one System Effect Parameter is chosen which may present unique numerical convergence problems.

For the BFGS, generic Conjugate Gradient, Newton-Raphson and Simulated Annealing techniques the objective function is given by the following. Note that $M_L$, $M_W$, $M_H$ and $M_T$ are real numbers; $M_L$ & $M_H$ are typically equal to one, while $M_W$ & $M_T$ are typically greater than one. Again, the System Effect Parameters, $L'_{Fuel}$, $m_{AF}$, $HHV_{k3}$ and $WF_{H2O}$, are functions of a set of $\Lambda_i$.

$$\lambda_L = [(L'_{Fuel} - L'_{Fuel-Ref})/L'_{Fuel-Ref}]^{M_L} \quad (2A)$$

$$\lambda_W = [(m_{AF} - m_{AF-PLT})/m_{AF-PLT}]^{M_W} \quad (2B)$$

$$\lambda_H = [(HHV_{k3} - HHV_{k3-Ref})/HHV_{k3-Ref}]^{M_H} \quad (2C)$$

$$\lambda_T = [(WF_{H2O} - WF_{H2O-Ref})/WF_{H2O-Ref}]^{M_T} \quad (2D)$$

$$F(\vec{x}) = \Sigma_{i \in I}\{S_i[1.0 - J_0(\lambda_L)] + S_i[1.0 - J_0(\lambda_W)] + S_i[1.0 - J_0(\lambda_H)] + S_i[1.0 - J_0(\lambda_T)]\} \quad (3)$$

In Eq.(3) and as used elsewhere, the symbol $\Sigma_{i \in I}$ indicates a summation on the index i, where i variables are contained in the set I defined as the elements of $\vec{\Lambda}$. For example, assume the user has chosen the following: $\Lambda_{1S}$ is to be optimized to minimize the error in $L'_{Fuel}$ and $HHV_{MAF}$, $\Lambda_{2S}$ is optimized for $L'_{Fuel}$ and $m_{AF}$ ($M_E$=1.40), $\Lambda_4$ is optimized for $L'_{Fuel}$, and $\Lambda_{7B}$ is optimized for $L'_{Fuel}$. Therefore: $\vec{\Lambda} = (\Lambda_{1S}, \Lambda_{2S}, \Lambda_4, \Lambda_{7B})$, $I = \{\Lambda_{1S}, \Lambda_{2S}, \Lambda_4, \Lambda_{7B}\}$, thus $\vec{x} = (x_1, x_2, x_3, x_4)$; $x_1 = S_1 \Lambda_{1S}$; $x_2 = S_2 \Lambda_{2S}$; $x_3 = S_3 \Lambda_4$; $x_4 = S_4 \Lambda_{7B}$; where Eq.(3) for this example then becomes:

$$F(\vec{x}) = S_1\{[1.0 - J_0(\lambda_L)] + [1.0 - J_0(\lambda_H)]\} + S_2\{[1.0 - J_0(\lambda_L)] + [1.0 - J_0(\lambda_W)]\} + S_3[1.0 - J_0(\lambda_L)] + S_4[1.0 - J_0(\lambda_L)]$$

Derivatives $\partial F / \partial x_i$ for the BFGS and generic Conjugate Gradient techniques, based on Eq.(3), are given by the following:

$$\partial F / \partial x_i = \partial F / (S_i \partial \Lambda_i) \quad (4)$$
$$= J_1(\lambda_L)[\partial \lambda_L / \partial \Lambda_i] + J_1(\lambda_W)[\partial \lambda_W / \partial \Lambda_i] +$$
$$J_1(\lambda_H)[\partial \lambda_H / \partial \Lambda_i] + J_1(\lambda_T)[\partial \lambda_T / \partial \Lambda_i]$$

where, for example: $[\partial \lambda_W / \partial \Lambda_i] = M_W [(\overline{m}_{AF} - m_{AF-PLT})/m_{AF-PLT}]^{M_W - 1} [\partial m_{AF}/(m_{AF-PLT} \partial \Lambda_i)]$; and $\lambda_L$, $\lambda_W$, $\lambda_H$, $\lambda_T$ and $\overline{m}_{AF}$ are average values. Gradients, $\partial F_i/\partial x_j$, for the Newton-Raphson method, thus defining the Jacobian determinant, are given by the following:

$$\partial F_i / \partial x_j = \partial F_i / (S_j \partial \Lambda_j) \quad (5)$$
$$= S_i J_1(\lambda_L)[\partial \lambda_L / (S_j \partial \Lambda_j)] +$$
$$S_i J_1(\lambda_W)[\partial \lambda_W / (S_j \partial \Lambda_j)] +$$
$$S_i J_1(\lambda_H)[\partial \lambda_H / (S_j \partial \Lambda_j)] +$$
$$S_i J_1(\lambda_T)[\partial \lambda_T / (S_j \partial \Lambda_j)]$$

where, for example: $[\partial \lambda_W / \partial \Lambda_j] = M_W[(\overline{m}_{AF} - m_{AF-PLT})/m_{AF-PLT}]^{M_W - 1}[\partial m_{AF}/(m_{AF-PLT} \partial \Lambda_j)]$.

In the preferred embodiment, selection of Choice Operating Parameters may be made by the power plant engineer from any combination or all of the following:

$\Lambda_{1S} = d_{Act}$; Stack $CO_2$ (with effects from air pre-heater leakage) (11S)

$\Lambda_{1B} = d_{Act} R_{Act}$; Boiler $CO_2$ (without effects from air pre-heater leakage) (11B)

$\Lambda_{2S} = J_{Act} = j_{Act} + b_A \beta$; Stack $H_2O$ (with moisture from air pre-heater leakage) (12S)

$\Lambda_{2B} = j_{Act} R_{Act}$; Boiler $H_2O$ (without moisture from air pre-heater leakage) (12B)

$\Lambda_3 = AF$; Air/Fuel mass ratio (13)

$\Lambda_4 = R_{Act}$; Air Pre-Heater Leakage Factor (14)

$\Lambda_5 = A_{Act}$; Concentration of $O_2$ in the boundary air (15)

$\Lambda_6 = m_{LS}$; System's indicated limestone flow rate (16)

$\Lambda_{7S} = G_{Act} = g_{Act} + a\beta$; Stack $O_2$ (with air pre-heater leakage) (17S)

$\Lambda_{7B} = g_{Act} R_{Act}$; Boiler $O_2$ (without air pre-heater leakage) (17B)

$\Lambda_8 = m_T$; Tube leakage flow rate (18)

The selection of one or more of the Choice Operating Parameters must depend on common understanding of power plant stoichiometrics and associated relationships to physical equipment. Specifically, The Input/Loss Method produces, by employing one or more of the minimization techniques (within the ERR-CALC computer program), converged Choice Operating Parameters and correction factors $C_i$ applied to the initial values $\Lambda_{0-i}$. The converged Choice Operating Parameters are then used within the Fuel Iterations to produce a computed fuel chemistry, discussed in conjunction with FIG. 2. A monitoring cycle, processing Fuel Iterations, may be scheduled as frequently as desired; each cycle employing correction factors produced by ERR-CALC at the same or slower frequency. For example, ERR-CALC could be processed (producing updated correction factors) once per day, while Fuel Iterations are processed once every 3 minutes.

In the above paragraph, the phase "common understanding of power plant stoichiometrics and associated relationships to physical equipment" is meant the routine knowledge base a power plant engineer should have concerning his/her thermal system. To thoroughly teach this invention, examples of such common understanding and their associated impacts on this invention follow: if limestone ($\Lambda_6$) is not used, the power plant engineer would not select limestone flow as a Choice Operating Parameter as such a selection would result in an unity correction factor, non-convergence, warning messages, and a faulted condition produced from ERR-CALC; the selection of the Air Pre-Heater Leakage Factor ($\Lambda_4$) would not be made if the system uses a tubular exchanger which has no air leakage (as designed), and would result in a similar faulted condition; the selection of the air/fuel ratio ($\Lambda_3$) leading to determination of fuel ash fraction, and also invoking a constant fuel ash assumption, would not be made as such a selection would result in a similar faulted condition; the selection of Boiler $CO_2$ ($\Lambda_{1B}$), an Air Pre-Heater Leakage Factor ($\Lambda_4$), and Boiler $O_2$ ($\Lambda_{7B}$), given that "correcting" the air pre-heater leakage would have no effect on the Boiler-side mix of $CO_2$ and $O_2$, would result in a similar faulted condition.

The use of the exponents $M_L$, $M_W$, $M_H$ and $M_T$ in Eqs.(2A), (2B), (2C) and (2D), termed Dilution Factors, allows a dilution or dampening of the functionality between Reference System Effect Parameters ($L'_{Fuel-Ref}$, $m_{AF-PLT}$, $HHV_{k3-Ref}$ and $WF_{H2O-Ref}$) and selected Choice Operating Parameters ($\vec{\Lambda}$). As an important feature of this invention, Dilution Factors allow the numerical processes to recognize that Reference System Effect Parameters may themselves have bias. Examples of such bias include: Reference Fuel Characteristics having been chosen with an out-dated database, biasing the computed reference L Factor; the reference heating value having been determined incorrectly, analyzed incorrectly in the laboratory and/or having intrinsic uncertainties; and the indicated fuel flow having serious instrumentation error. However, engineering judgement and a valid database may be reasonably anticipated and applied in the cases of reference L Factors and reference heating values. Dilution Factors $M_L$ (influencing $L'_{Fuel-Ref}$) and $M_H$ (influencing $HHV_{k3-Ref}$) may be assumed to be unity for most situations as is preferred; or they may be based on monitoring experience, sensitivity studies or as otherwise determined. However, for coal-fired plants, applying engineering judgement and/or a valid database is difficult in the case of the plant's indicated fuel flow; which will always have bias. Thus $M_W$ (influencing $m_{AF-PLT}$) should be determined based on results from The Input/Loss Method and the processes of this invention, when such results are generically compared to system data. Specifically, $M_W$ may be adjusted until Input/Loss computed total effluent flow reasonably agrees and/or tracks the measured, computed combustion air flow agrees and/or tracks the measured, computed fuel flow agrees and/or tracks the indicated fuel flow, and similar system-wide comparisons. In the context of the last sentence, "tracks" is defined as the computed value trending over time with the measured, having a constant off-set. In the case of fuel water fraction as used directly as a System Effect Parameter, $WF_{H2O}$ is driven towards a reference value by optimizing tube leakage flow ($\Lambda_8$); when so employed System Effect Parameter $WF_{H2O}$ is considered a special case. Application of Dilution Factors require that the sense of the bracketed terms of Eqs.(2A), (2B), (2C) and (2D) be always positive requiring a reversal of the derivative's sign as appropriate. The Dilution Factors $M_L$, $M_W$, $M_H$ and $M_T$ are real numbers; $M_L$ & $M_H$ are typically assumed to be unity, while $M_W$ & $M_T$ are typically found through sensitivity studies to be non-unity (ranging between 0.90 and 1.10 for $M_W$, and 1.1 to 1.6 for $M_T$)

In these relationships each Choice Operating Parameter ($\Lambda_i$) is scaled with the parameter $S_i$, determined to be suitable for the BFGS, generic Conjugate Gradient and Newton-Raphson techniques. Scaling for these methods is important for proper application of this invention, as minimization techniques in general are sensitive to variations in the numerical size, and units of measure, of the $\Lambda_i$ terms (e.g., for power plant applications, an un-scaled $\Lambda_{1S}$ may be 0.14 moles-$CO_2$/mole-Dry-Stack-Gas, while an un-scaled $\Lambda_6$ may be 22,000 lbm/hr). It has been found that a good initial estimate of $S_i$ may be developed as the inverse of $\Lambda_i$. Further, the influence of scaling may be improved by employing a pre-scaling factor, $s_i$; which may be determined as taught in '879, or as otherwise determined by the power plant engineer through sensitivity studies. It has been found that $s_i$ for $\Lambda_8$ typically of 10,000 works well if $\Lambda_8$ units of measure are lbm/hr. However, it has also been found that the Newton-Raphson technique converges quickly when optimizing the combination of $\Lambda_{2S}$ or $\Lambda_{2B}$, and $\Lambda_8$, thus may be used to adjust $s_i$ for $\Lambda_8$ until appropriate sensitivity is reached between the Choice Operating Parameters of effluent water and tube failure flow rate (that is when one term does not predominate the other).

$$S_i = s_i / \Lambda_{0-i} \quad (6)$$

$$x_i = S_i \Lambda_i \quad (7)$$

When ERR-CALC is executed using either BFGS, generic Conjugate Gradient or Newton-Raphson techniques typically 5 to 50 iterations are required for convergence. However, when ERR-CALC is executed using Simulated Annealing typically over 1000 iterations are required for convergence. To address the problem of long computing times, associated with any Method Option, this invention teaches to duplicate within the ERR-CALC program only those calculations which effect System Effect Parameters, and to therefore compute System Effect Parameters within ERR-CALC (which are also repeated within the Fuel Iterations). This results in a considerable reduction in computing time required to evaluate repeated objective function calculations. Specifically, these duplicated calculations include: principally HEATRATE stoichiometrics (which are also within EX-FOSS); L Factor calculations; heating value calculations; and an approximation of the effects changing stoichiometrics and changing heating value has on boiler efficiency and thus the effects on computed fuel flow using Eq.(8). In summary, these duplicated calculations determine affects on the System Effect Parameters ($L_{k1}$, $m_{AF}$, $HHV_{k3}$ and $WF_{H2O}$) of a given set of Choice Operating Parameters ($\vec{\Lambda}$).

Applicable references for the preferred minimization techniques include the following sources. For the BFGS and the generic Conjugate Gradient techniques the references are: D. F. Shanno and K. H. Phua, "Algorithm 500, Minimization of Unconstrained Multivariate Functions", *ACM Transactions on Mathematical Software*, Vol.2, No.1, March 1976, pages 87–94; and D. F. Shanno and K. H. Phua, "Remark on Algorithm 500, Minimization of Unconstrained Multivariate Functions", *ACM Transactions on Mathematical Software*, Vol.6, No.2, December 1980, pages 618–622. For the Simulating Annealing technique the references are: W. L. Goffe, G. D. Ferrier and J. Rogers, "Global Optimization of Statistical Functions with Simulated Annealing", *Journal of Econometrics*, Vol.60, No.1/2, pp.65–100, January/February 1994; for its base technology see: A. Corana, M. Marchesi, C. Martin and S. Ridella, "Minimizing Multimodal Functions of Continuous Variables with the 'Simulated Annealing' Algorithm", *ACM Transactions on Mathematical Software*, Vol.13, No.3, pp.262–280, September 1987; for modifications to the random number generator RANMAR which is employed by Simulating Annealing see: F. James, "A Review of Pseudorandom Number Generators", *Computer Physics Communications*, Vol.60, pp.329–344, 1990. For the Newton-Raphson technique the reference is: W. H. Press, S. A. Teukolsky, W. T. Vettering & B. P. Flannery, *Numerical Recipes in FORTRAN 77, The Art of Scientific Computing*, Cambridge University Press, Cambridge and New York (1992), Chapter 9.6 on Newton-Raphson Method for Nonlinear Systems of Equations, and Chapter 9.7 on Globally Convergent Methods for Nonlinear Systems of Equations.

Additional minimization techniques and teachings of related mathematical procedures which may be applied to this invention, are presented in the following: J. Nocedal and S. J. Wright, *Numerical Optimization*, Springer-Verlag, New York (1999); G. N. Vanderplaats, *Numerical Optimization Techniques for Engineering Design*, McGraw-Hill Book Company, New York (1984); and W. H. Press, S. A. Teukolsky, W. T. Vettering & B. P. Flannery, *Numerical Recipes in FORTRAN 77, The Art of Scientific Computing*, Cambridge University Press, Cambridge and New York (1992). Other common minimization techniques involving constrained or unconstrained searches may also be alternatively applied. These include Sequential Linear Programming, Direction Set using Powell's method, Simplex method, Downhill Simplex method, Simplex method with product form inverse, Quasi-Newton method, and others. Commercial products are also available, such as from Lindo Systems, Inc. of Chicago, Ill.

A further technique applicable to the reduction of errors in Choice Operating Parameters lies with use of neural network technology (herein termed NN). NN technology may be applied to recognize patterns in computed System Effect Parameters influenced by causal Choice Operating Parameters. Much like the aforementioned techniques of the preferred embodiment, NN technology may make corrections to initial Choice Operating Parameters to achieve a desired result [for example, to minimize the $\lambda_L$, $\lambda_W$, $\lambda_H$ and/or $\lambda_T$ terms of Eqs.(2A), (2B), (2C) and (2D)]. Such corrections are based on choosing the highest probability a set of $\Lambda_i$ will produce the lowest errors in System Effect Parameters relative to Reference System Effect Parameters. An advantage to NN is that such corrections are learned; that is, NN improves its correlations with an ever increasing database. Typically such learning may be done without use of an objective function, but not always as in the case of object oriented NN. Specifically, Choice Operating Parameters used to compute fuel chemistries and heating values (leading to boiler efficiency and system heat rate), may be analyzed for their influences on System Effect Parameters, patterns then recognized which then lead directly to corrections being determined via Eq.(1). Given such corrections, The Input/Loss Method would proceed as described herein, and in '711 and '879 as applicable.

Numerous commercial NN technology software packages are available, for example from: NeuralWare of Pittsburgh, Pa.; California Scientific Software of Nevada City, Calif.; The MathWorks, Inc. of Natick, Mass.; Pegasus Technology of Mentor, Ohio a subsidiary of KFx, Inc; NeuCo, Inc. of Boston, Mass.; those available from universities; and those to be found on the internet. A particularly applicable NN technology is available from Computer Associates of Islandia, NY comprising their Neugents technology. In addition, any NN technology which allows for object oriented programming are directly applicable to this invention as such objects, as mathematical kernels, may explicitly describe a variety of Input/Loss methods.

However, NN technology is not the preferred embodiment given that such technology is historically intended for large databases, databases representing processes too complex for explicit thermodynamics and/or databases whose applicable objective functions are unknown or otherwise may not be readily discerned. The teachings of the preferred embodiment of this invention may be applied directly using NN technologies which have application following the general scope and spirit of the present invention.

Tube Leakage Flow Rate Computations

To determine a tube leakage flow rate using the direct application of the aforementioned techniques, that is selecting Choice Operating Parameter for tube leakage flow ($\Lambda_8$), in combination with others, as optimized for any or all System Effect Parameters $L'_{Fuel}$, $m_{AF}$, $HHV_{k3}$, and/or $WF_{H2O}$ has been demonstrated at coal-fired power plants to be functional as taught herein. However the strict application of such techniques is not preferred when determining both the flow rate and the location of the leaking tube. The preferred technique for determining a tube leakage flow rate is presented in three steps (termed "Passes") detailed below. The technique for determining the location of the failed tube within the steam generator is detailed by separate subsection. In summary, for the preferred embodiment, once a possible tube failure has been identified (via a TABLE 1 trip mechanism): a tube leakage flow rate is determined by optimizing $\Lambda_8$, in combination with other Choice Operating Parameters except for $\Lambda_{1S}$, $\Lambda_{1B}$, $\Lambda_{2S}$ and $\Lambda_{2B}$. Nominal correction factors to effluent $CO_2$ and effluent water are obtained from historical evidence. This achieves stoichiometric balance, an initial fuel chemistry and heating value assuming the nominally corrected effluent $CO_2$ and effluent water are reasonably accurate. Next a final fuel chemistry and heating value are determined but this time as influenced by the determined tube leakage flow rate and all routine Choice Operating Parameters, except $\Lambda_{2S}$ or $\Lambda_{2B}$; that is, Choice Operating Parameters as would be routinely selected whose inter-dependencies are now effected by an established tube leakage. As defining a "separative analyses process", it was developed to address the situation where effluent water, based on either a measurement or an assumption, was being corrected without regard to how such a correction might influence other Choice Operating Parameters, especially tube leakage and the important effluent $CO_2$. For example, if in correcting a high effluent water signal (whose $\Lambda_{0-2S}$ value reflects an actual tube failure) to a lower nominal value, the resultant Dry-based effluent $CO_2$ may become badly skewed effecting computed heating value. The preferred process first accepts the effluent water value using an historically based correction factor, $C_{2S-hist}$, i.e., not optimizing on $\Lambda_{1S}$, $\Lambda_{1B}$, $\Lambda_{2S}$ or $\Lambda_{2B}$, but optimizing on $\Lambda_8$ and all other Choice Operating Parameters. This optimization establishes a computed tube leakage flow rate, consistent fuel chemistry and a heating value given a tube leakage. The computed tube leakage could be essentially zero if determined to be stoichiometrically consistent. The process then repeats but including $\Lambda_{1S}$ or $\Lambda_{1B}$ and other Choice Operating Parameters, again except effluent water, and using the computed tube leakage flow rate. This final process then reflects nominal values given the constrained methodology used by Simulated Annealing; for example, computed fuel carbon established in-part from $\Lambda_{1S}$ will lie between $\alpha_{MAF-4/min}$ and $\alpha_{MAF-4/max}$; effluent water is nominally corrected and is consistent with the computed tube leakage.

The preferred technique, versus a straightforward application of '879, addresses several problem areas found during the demonstration of this invention: the marked insensitivity of small tube leakages on system stoichiometrics; correction factors being adversely influenced by an actual tube leakage, but the resulting effects of converged Choice Operating Parameters on stoichiometrics would mask detection of tube leakage; shallow valley problems aggravated by tube failures; and marked differences, and possible problems, associated with scaling Choice Operating Parameters especially with widely varying tube leakage flow rates (e.g., from 2,000 to 200,000 lbm/hr). Further, this separative analyses process lends itself to the determination of the tube leak's location within the steam generator.

Pass 0 of the preferred embodiment represents a typical monitoring cycle using The Input/Loss Method, but where the user has optioned for tube failure checking at each execution of the ERR-CALC program. A typical monitoring cycle involves minimizing errors in System Effect Parameters ($L'_{Fuel}$, $m_{AF}$, $HHV_{k3}$ and/or $WF_{H2O}$) by optimizing a selection of routine Choice Operating Parameters applicable to the thermal system and its fuel, but not use of $\Lambda_8$. For such routine monitoring $m_T=b_T=0.0$ is assumed for the stoichiometrics of Eqs.(19B) and (20). The optimization employs any multidimensional minimization technique, and/or NN technology, appropriate to the thermal system and its fuel. This type of monitoring, using routine Choice Operating Parameters, is taught in '879 and herein, and typifies normal use of ERR-CALC. This process defines Pass 0 logic described in FIG. 3.

If tube failure checking (the option having been activated in Pass 0) has detected a trip mechanism (see TABLE 1), a Pass 1 process is then begun to determine a computed tube leakage flow rate. Within this Pass 1 routine Choice Operating Parameters used in Pass 0 are selected with $\Lambda_8$, but excluding effluent $CO_2$ and effluent water ($\Lambda_{1S}, \Lambda_{1B}, \Lambda_{2S}$ and $\Lambda_{2B}$). Choice Operating Parameter $\Lambda_8$ is optimized to drive the As-Fired fuel water fraction, $WF_{H2O}$, or the computed fuel flow, $m_{AF}$, to their respective reference values ($WF_{H2O-Ref}$ or $m_{AF-PLT}$). Corrections to effluent $CO_2$ and effluent water are set to historical values associated with established instrumentation experience (or an assumption) not reflective of tube failure. For example, effluent Stack water may be equated to $C_{2S-hist}\Lambda_{0-2S}$ where $C_{2S-hist}$ is a nominal correction factor and $\Lambda_{0-2S}$ based on plant data. Corrections to effluent $CO_2$ and effluent water are thus held constant for Pass 1. Other correction factors, $C_i$, established in Pass 0 are used with initial $\Lambda_{0-i}$ estimates. This process results in a computed tube leakage flow rate which satisfies stoichiometric balances of Eqs.(19B) and (20), providing a solution in which fuel chemistry and heating value fall within numerical constraints (min/max limits). Note that other System Effect Parameters may be used, optimizing $\Lambda_8$, such as $HHV_{AF}$, however either $WF_{H2O}$ or $m_{AF}$ have proven to be appropriately sensitive to the stoichiometrics and represent the preferred embodiment. This process defines Pass 1 logic described in FIG. 3.

After convergence of Pass 1, Pass 2 then re-establishes System Effect Parameters with the previous selection of routine Choice Operating Parameters, but excluding effluent water (those effects are now replaced by the computed tube leakage flow rate). The Simulating Annealing algorithm is preferred; however for this Pass 2 BFGS has been observed to be adequate if properly scaled. Convergence results in converged Choice Operating Parameters, noting that all Choice Operating Parameters which were being used in Pass 0 are now influenced by a tube leakage flow rate ($m_T$), including a nominally corrected effluent water. Pass 1 and Pass 2 employ Simulated Annealing technique as the preferred embodiment given its ability to address: shallow valley problems; the possibility of considerably different scaling associated with small to large tube failure flows; its constrained search methodology in which the Choice Operating Parameters are numerically bound; and that a variety of Choice Operating Parameters may have wide ranging numerical values. This process defines Pass 2 logic described in FIG. 3. Note that whenever $m_T$ is determined greater than zero, procedures as taught by this invention then incorporate the influence of such leakage into combustion stoichiometrics through the $b_T$ molar quantity determined as follows:

$$b_T = m_T(xN_{AF})/(N_{H2O}m_{AF}) \qquad (21A)$$

$$m_T = b_T(N_{H2O}m_{AF})/(xN_{AF}) \qquad (21B)$$

The $b_T$ quantity, through use in Eq.(19B), then effects boiler efficiency, computed fuel flow and heat rate computations in the same manner as the $b_Z$ quantity as taught in '711 and '853; $b_Z$ in '711 and '853 being replaced by the quantity ($b_Z + b_T$). Thus if the quantities: $N_{AF}$; the molecular weight of the working fluid (water is assumed); $m_{AF}$ (or $m_{AF-PLT}$ if the computed is not available); the tube leakage moles ($b_T$); and resolution of the stoichiometric model of the combustion process, then Eq.(21B) may be solved for $m_T$ without use of minimization or NN techniques.

To further assist in teaching this invention, TABLE 2 presents a typical scenario of routine monitoring, the identification of a possible tube leak, and then the resolution of the tube leakage flow rate. In TABLE 2, the second column denotes the selection of Choice Operating and System Effect Parameters; for example, "$\Lambda_{1S}$ min $L'_{Fuel}$" means that Choice Operating Parameter $\lambda_{1S}$, see Eq.(11S), is selected to minimize the error in System Effect Parameter $L'_{Fuel}$. The use of "$\Lambda_{1S}$ min $L'_{Fuel}$", "$\Lambda_{2S}$ min $L'_{Fuel}$" and "$\Lambda_4$ min $L'_{Fuel}$" used in Pass 0 is typical for the assumed thermal system. If measuring Stack $O_2$ instead of Boiler $O_2$ as used in TABLE 2, the selection would typically consist of only "$\Lambda_{1S}$ min $L'_{Fuel}$" and "$\Lambda_{2S}$ min $L'_{Fuel}$". The third column in TABLE 2 describes computational options available to Input/Loss users, see '879 for these and others.

TABLE 2

Example of Determining Tube Failure Flow Rate using the Preferred Embodiment

| The Thermal System and Computational Sequence | Optimizations | Input/Loss Options |
| --- | --- | --- |
| Routine monitoring of a coal-fired system having high water, low & constant ash; multiple $O_2$ instruments are used at the Boiler having high accuracy; $CO_2$ & $H_2O$ Stack instruments; uncertain air leakage. Defines Pass 0. | $\Lambda_{1S}$ min $L'_{Fuel}$ $\Lambda_{2S}$ min $L'_{Fuel}$ $\Lambda_4$ min $L'_{Fuel}$ | Compute As-Fired fuel chemistry with constant fuel ash every 3 minutes; optimization of Choice Operating Parameters every 30 minutes using BFGS technique with Tube Failure Model option invoked. Historically: $C_{1S} = 0.96$, $C_{2S} = 1.02$ and $C_4 = 1.10$. |
| A possible tube failure has been detected given tube failure mechanism 51 (see TABLE 1). Use historical values for $C_{1S}$ & $C_{2S}$; $\Lambda_{0-8} = 500$ lb/hr. Defines Pass 1. | $\Lambda_4$ min $L'_{Fuel}$ $\Lambda_8$ min $WF_{H2O}$ | Compute As-Fired fuel chemistry with constant fuel ash; optimization using Simulated Annealing. Results in the computed tube leakage flow rate, $m_T$, which satisfies stoichiometrics. |
| Return to routine monitoring but including the computed tube leakage flow rate, mT, but excluding effluent water ($C_{2S} = 1.02$). Defines Pass 2. | $\Lambda_{1S}$ min $L'_{Fuel}$ $\Lambda_4$ min $L'_{Fuel}$ | Compute As-Fired fuel chemistry as in Pass 0, resulting in converged Choice Operating Parameters associated with the computed tube leakage flow rate. |

Tube Leak Location

A important feature of this invention is its ability to assess the impact of a tube leak on the thermal performance of the system, and where within the steam generator the leak occurs. Once a tube leakage flow rate has been determined, its impact on the total energy flow to the working fluid and on boiler efficiency may be determined; thus its effects on fuel flow and system heat rate may be understood. If a thermal system's feedwater flow is held essentially &s By constant, then a developing tube leak will result in less total energy flow required from the combustion gases; i.e., a reduction in the working fluid's energy flow required to met the same working fluid boundary pressures and temperatures. If the working fluid energy flow without tube leakage is termed BBTC, then the actual energy flow, assuming a tube leak, is given by: (BBTC−$m_T\Delta h$), where $\Delta h$ is the enthalpy difference between the outlet of last heat exchanger affected by the leakage, $h_{Last}$, and the first exchanger so affected, $h_{Leak}$ (i.e., the heat exchanger in which the leak occurs); $m_T\Delta h$ is the energy flow lost from the working fluid due to tube leakage. The enthalpy of the leaking fluid as it enters the combustion gas path, $h_{Leak}$, is assumed, by choice, to be the same as the heat exchanger's inlet enthalpy (any location may be applied). When applied to The Input/Loss Method of computing boiler efficiency, the enthalpy of the leaking fluid entering the combustion gas path as affecting the Firing Correction term must be referenced to its proper energy level as taught in '853; thus the term ($h_{Leak}-h_{f-Cal}$), note that in '853 the subscript "Steam" is replaced with "Leak" as used here. Quantitative effects on boiler efficiency and system heat rate are not obvious and may not be off-setting, they are preferably described through use of The Input/Loss Method of '711 and '853; they may also be described through use of other Input Loss methods, or may be described through use of any method which determines boiler efficiency and system heat rate given knowledge of the fuel's heating value and other dependent quantities. Computed As-Fired fuel flow and system heat rate are then determined by the following, assuming a tube leak:

$$HR = m_{AF}(HHVP + HBC)/W_{output} \quad (9)$$

$$= (BBTC - m_T\Delta h)/(\eta_{B-HHV} W_{output}) \quad (10)$$

It is important to this invention to recognize that the location of the tube failure effects the working fluid's energy flow. The typical steam generator used in the electric power industry routes the working fluid first through an economizer heat exchanger, then through a series of water wall heat exchangers and the boiler drum (if a sub-critical unit), through a primary super-heater, through a final super-heater, and, lastly, through a reheat exchanger. Although the preceding is typical, numerous configurations of different heat exchanger names and types may be found, including, for example: lower economizers, upper economizers, primary secondary super-heaters, final secondary super-heaters, division walls, front reheaters, rear reheaters, etc. Such heat exchangers need to be identified by order. If a tube leak occurs in an economizer, its loss is seen throughout the steam generator (having the greatest impact on working fluid energy flow, e.g., $\Delta h = h_{Reheat-outlet} - h_{Leak}$). If a tube leak occurs in the final reheat exchanger, its loss only effects this last exchanger (having the least impact on working fluid energy flow and thus on computed fuel flow, $\Delta h = h_{Reheat-outlet} - h_{Reheat-inlet}$). This suggests that Eq.(8) has an unique solution dependent on the assigned (and actual) location of the tube leakage. When using one of the appropriate Input/Loss methods, such dependency on a location of the tube leak may be intrinsically a function of computed fuel chemistry and Firing Corrections, and thus, also a function of the resultant heating value and boiler efficiency.

Determination of the location of the tube leak is accomplished by recognizing that certain System Effect Parameters are a function of the working fluid energy flow (as effected by tube failure flow rate and its location). The System Effect Parameter of computed fuel flow, $m_{AF}$, is a function of ($BBTC-m_T\Delta h$) through Eq.(8). The System Effect Parameter of As-Fired fuel water fraction, $WF_{H2O}$, is a function of the ($BBTC-m_T\Delta h$) term through effects on boiler efficiency ($\eta_{B-HHV}$), heating value (HHV), and Firing Corrections (HBC). Although not obvious, The Input/Loss Method, because it determines fuel chemistry, heating value, boiler efficiency and Firing Corrections independent of fuel flow, and with great consistency, must, never-the-less, effect computed boiler efficiency consistently as taught in '853:

$$\eta_{B-HHV} = (BBTC - m_T\Delta h)/[m_{AF}(HHVP + HBC)] \quad (11A)$$

$$= (-HPR_{Act} + HRX_{Act})/(HHVP + HBC) \quad (11B)$$

Eq.(11B) must reflect a consistently computed boiler efficiency; just as Eq.(11A) as composed of a term which reflects tube failure location ($BBTC-m_T\Delta h$), and therefore reflects a consistently computed boiler efficiency. The Enthalpy of Products and the Enthalpy of Reactants terms of Eq.(11B), $HPR_{Act}$ and $HRX_{Act}$, are computed with terms influenced by both the tube leakage flow and its location. $HPR_{Act}$ includes the enthalpy of all water exiting the system, relative to the enthalpy at their entry points into the combustion gas path; e.g., ($h_{stack}-h_{Leak}a$) for the tube leakage. $HRX_{Act}$ includes the Firing Correction term which includes the entering enthalpy of all in-leakages of water including tube leaks, relative to a reference enthalpy taken as the saturated liquid enthalpy at the calorimetric temperature, that is: ($h_{Leak}-h_{f-cal}$).

Determination of which heat exchanger has a tube leak is accomplished by assigning the tube leak to successive heat exchangers, in repetitive computations involving ERR-CALC and Fuel Iterations, and then examining "key comparative parameters" produced from these computations for deviations from their "reference key comparative parameter". Reference key comparative parameters being determined from a Fuel Iteration without tube leakage, or as otherwise obtained. If using the System Effect Parameter of computed fuel flow, $m_{AF}$, such key comparative parameters include: the As-Fired fuel flow, the average fuel water fraction and heating value. The following weighings of these key comparative parameters has been found useful in determining the lowest deviation:

$$\text{Deviation}=0.05|(m_{AF-PLT}-m_{AF})/m_{AF-PLT}|+0.75|(WF_{H2O-Ref}-WF_{H2O})/WF_{H2O-Ref}|+0.20|(HV_{Ref}-HHV)/HHV_{Ref}| \quad (12)$$

If using the System Effect Parameter of As-Fired fuel water fraction, $WF_{H2O}$, such key comparative parameters include: the As-Fired fuel flow, the average fuel water fraction and heating value. The following weighings of these key comparative parameters has been found useful in determining the lowest deviation:

$$\text{Deviation}=0.75|(m_{AF-PLT}-m_{AF})/m_{AF-PLT}|+0.05|(WF_{H2O-Ref}-WF_{H2O})/WF_{H2O-Ref}|+0.20|(HHV_{Ref}-HHV)/HHV_{Ref}| \quad (13)$$

Other key comparative parameters have been studied and have been found as useful as those used in Eqs.(12) & (13), depending on the thermal system and its fuel, and the convergence criteria employed by the minimization techniques. These other key comparative parameters include those in the following list; however, this list is not meant to be exhaustive but representative of the scope, spirit and flexible application of the invention:

Boiler efficiency;

Dry heating value;

Specific working fluid energy flow [($BBTC-m_T\Delta h$)/$m_{AF}$];

Weight fraction of fuel carbon as computed by Input/Loss;

Weight fraction of fuel hydrogen as computed by Input/Loss;

Numerical convergence associated with Minimization Techniques;

Numerical convergence associated with NN technologies;

Computed overall heat transfer coefficient of the assumed leaking heat exchanger;

Computed log-mean-temperature difference of the assumed leaking heat exchanger;

Computed cleanliness factor of the assumed leaking heat exchanger;

Computed irreversible thermodynamic loss of the assumed leaking heat exchanger; and/or, Computed Fuel Consumption Index of the assumed leaking heat exchanger.

The preferred embodiment of this invention is to employ Eqs.(12) and (13). However, the weightings found in these equations are presented to demonstrate the general technique of determining a minimum deviation, and/or otherwise to determine the location of the failed tube. Such weightings may easily change depending on the nature of the fuel being burned, the design of the thermal system, the key comparative parameters employed, and the specific computational procedures employed from one of the various Input/Loss methods. These weightings and the development of a set of key comparative parameters may be determined through simulations of failed tubes, locating the failures within different heat exchangers of the thermal system.

The preferred embodiment used to resolve the location of the heat exchanger containing a failed tube is to first establish a set of "reference key comparative parameters" associated with no tube leakage, then to determine the net energy flow to the working fluid assuming the tube leakage is in a particular heat exchanger, repeating such determination until all heat exchangers have been so analyzed. Finally, deviations are formed, similar to Eqs.(12) or (13), from which the lowest deviation will indicate the heat exchanger with the failed tube. Note that if using the procedures taught in paragraphs 0075 through 0080 to determine the tube failure flow rate, then these same computational methods are used at every evaluation of the net energy flow to the working fluid and associated assumption of where the tube leakage is located. In summary, this invention teaches: to identify a set of heat exchangers descriptive of the thermal system as employed to transfer net energy flow to the working fluid from the combustion gases resulting in a set of identified heat exchangers; to then obtain a set of Operating Parameters applicable to the set of identified heat exchangers; to then determine a set of net energy flows to the working fluid from the combustion gases based on the set of identified heat exchangers, the set of Operating Parameters and the tube leakage flow, each said set of net energy flows descriptive of the thermal system and wherein the tube leakage flow is assigned to a different heat exchanger in each said set; to then determine a reference key comparative parameter for the thermal system resulting in a type of key comparative parameter; to then obtain a set of key comparative parameters associated with each identified heat exchanger and based on the set of net energy flows and the type of key comparative parameter; to then determine a set of deviations between the set of key comparative parameters and the reference key comparative parameter; to then determine an identification the leaking heat exchanger based on the set of deviations; and to then report to the operator of the thermal system the identification of the leaking heat exchanger such that corrective action may take place.

To further teach the application of this invention TABLE 3 presents results from a tube leak found in an economizer heat exchanger associated with a 700 MWe power plant burning high energy coal. Application of this invention resulted in determining the tube failure flow rate of 100,169 lb/hr, and identifying the location of the failed tube in the system's economizer since the economizer had the lowest analyzed deviation as seen in TABLE 3. To further teach the application of this invention TABLE 4 presents results from a tube leak analysis found in a division wall heat exchanger associated with a 600 MWe power plant burning Powder River Basin coal. Application of this invention resulted in determining the tube failure flow rate of 90,003 lb/hr, and identifying the location of the failed tube in the system's division wall heat exchanger since the division wall heat exchanger had the lowest analyzed deviation as seen in TABLE 4.

TABLE 3

Example of Using System Effect Parameter of Fuel Flow
(true leak found in the Economizer)

| Heat Exchanger | % Dev. per Eq. (12) | $m_{AF}$ (lb/hr) | $WF_{H2O}$ (fraction) | $WF_{Carbon}$ (fraction) | HHV (Btu/lb) | $m_T$ (lb/hr) |
| --- | --- | --- | --- | --- | --- | --- |
| Reference Data: | — | 484655 | 6.7854 | 69.8391 | 12406.10 | 0 |
| Economizer | 0.5856 | 484343 | 6.7337 | 69.8779 | 12412.90 | 100169 |
| Water Walls | 1.7508 | 483912 | 6.9401 | 69.7233 | 12385.50 | 98788 |
| Primary SH | 9.3283 | 484570 | 7.6132 | 69.2190 | 12295.90 | 94701 |
| Primary Sec. SH | 11.9633 | 484512 | 7.8470 | 69.0438 | 12264.80 | 93224 |
| Final Sec. SH | 12.3274 | 484066 | 7.8789 | 69.0199 | 12260.50 | 92939 |
| Reheat | 9.5705 | 484144 | 7.6343 | 69.2032 | 12293.10 | 94486 |

TABLE 4

Example of Using System Effect Parameter of Average Fuel
Water Fraction (true leak found in the Division Wall Heat Exchanger)

| Heat Exchanger | % Dev. per Eq. (13) | $m_{AF}$ (lb/hr) | $WF_{H2O}$ (fraction) | $WF_{Carbon}$ (fraction) | HHV (Btu/lb) | $m_T$ (lb/hr) |
| --- | --- | --- | --- | --- | --- | --- |
| Reference Data: | — | 619032 | 29.5616 | 48.7316 | 8300.27 | 0 |
| Lower Econ. | 1.2723 | 629489 | 29.5496 | 48.7400 | 8301.66 | 91815 |
| Upper Econ. | 0.9989 | 627270 | 29.5596 | 48.7331 | 8300.48 | 91353 |
| Water Walls | 0.7945 | 625486 | 29.5337 | 48.7509 | 8303.53 | 91331 |
| Primary SH | 0.2939 | 621366 | 29.5573 | 48.7346 | 8300.75 | 90422 |
| Div. Wall | 0.0010 | 619037 | 29.5615 | 48.7317 | 8300.26 | 90003 |
| Final SH | 0.1240 | 619009 | 29.5616 | 48.7317 | 8300.25 | 89836 |
| Reheat | 0.0931 | 619792 | 29.5612 | 48.7319 | 8300.29 | 90128 |

Although the present invention has been described in considerable detail with regard to certain preferred embodiments thereof, other embodiments within the scope of the present invention are possible without departing from the scope, spirit and general industrial applicability of the invention. For example, the tube leakage flow rate may be computed by applying the techniques discussed in paragraphs 0047 through 0074 (i.e., using a single computational pass). The tube leakage flow rate may be determined by use of any System Effect Parameter which indicates an appropriate sensitivity to system effects (with, or in addition to, $L'_{Fuel}$, $m_{AF}$, $HHV_{k3}$ and $WF_{H2O}$). The separative analyses process described above may acquire numerous variations; for example: Pass 1 correction factors maybe set to unity; or Pass 1 may only employ the Choice Operating Parameter of tube leakage flow rate. The method described is applicable to either higher heating value or lower heating value computations as supported by the teachings in '853. Accordingly, the general theme and scope of the appended claims should not be limited to the descriptions of the preferred embodiment disclosed herein. Further, aforementioned descriptions of this invention assume that a steam generator's working fluid is water, however the general procedures of this invention may be applied to any type of working fluid provided that the working fluid is measured (or otherwise assumed) at the boundary of the system. Examples of other working fluids are: mixtures of water and organic fluids, organic fluids, liquid metals and so-forth.

THE DRAWINGS

FIG. 1 is a schematic representation of a thermal system, particularly a conventional or fluidized bed power plant illustrating use of stoichiometric relationships important in applying this invention to actual systems. It should be studied in conjunction with combustion stoichiometrics terms of Eq.(19B). FIG. 1 depicts a power plant denoted as 20. In this power plant 20, a fuel feed 22 and combustion air 24 are all provided to the upstream side region 26 of the heat exchangers & combustion region 28. Note that this region 28 does not include the air pre-heater 36. In addition, in some types of power plants 20 such as those using fluidized bed combustors, other materials may be injected into region 26, such as a flow of limestone 31 to minimize effluent $SO_2$ by chemically binding sulfur as $CaSO_4$. Other sorbents may be injected to control sulfur or other pollutants. The fuel feed 22 contains, in general, combustible material, water and mineral matter (commonly called fuel ash). The fuel ash is an unburnable component that passes through the system with little physical change, but which is heated and cooled. In the heat exchangers & combustion region 28, the fossil fuel 22 is burned with the combustion air 24 to form hot products of combustion. Heat from the products of combustion is transferred to a working fluid 23 that enters heat exchangers 32 that are depicted as integral with the heat exchangers & combustion region 28. The heated working fluid 30 is used in a manner appropriate to a working fluid to generate a useful output 33 (for a conventional power plant such useful output may be supplied to a turbine cycle for the production of electrical power). Heat exchangers 32 may consist of a series of heat exchangers as explained in paragraph 0082. One heat exchanger of the collection of heat exchangers 32 may develop a leakage of its working fluid 27, which leakage mixes with the products of combustion 28. There may also be working fluid leakage 29 into the products of combustion 28 and/or into region 35, not associated with water in the fuel feed 22, or heat exchanger leakage 27, or moisture in the combustion air 24. Working fluid leakage 29 consists of known flows, or flows which may be otherwise reasonably assumed or determined; and may result from, for example, soot blowing associated with coal-fired systems, or working fluid used to atomize fuel 22 before combustion, or used in pollutant control processes located at 35 or 42. After leaving the heat exchangers & combustion region 28 on its downstream region 34, the cooler products of combustion commonly flow through ducts, region 35, which may contain effluent ash removal equipment, passing then to an air pre-heater 36, where a further portion of the combustion gas energy is transferred to an incoming air stream 38, which air then becomes the combustion air 24. The total air delivered to 20 is the incoming air flow 25. In many cases, an air leakage flow 40 enters the flow of the products of combustion as it passes through the air pre-heater 36. The further cooled products of combustion leave the air pre-heater 36 and pass to the Stack 42, then being exhausted to the local environment. Within power plant 20 the combustion gas path is defined as that region encompassing the flow of products of combustion, said products also termed combustion gases, generally occupying regions 28, 35, the gas side of 36, and 42.

FIG. 1, given its general system description provided above, is applicable to a wide variety of fossil-fired power plants, such coal-burning power plants, oil-burning power plants, gas-fired power plants, biomass combustors, fluidized bed combustors, conventional electric power plants, steam generators, package boilers, combustion turbines, and combustion turbines with heat recovery boilers. This list is not meant to be exhaustive, however, and is presented to illustrate some of the areas of applicability of the present invention which encompass any thermal system burning a fossil fuel and which has at least one heat exchanger whose working fluid is being heated by the products of combustion. This invention is applicable to a wide variety of Input/Loss methods, especially its teachings as to identifying the location of the failed tube. If a thermal system is to be characterized quantitatively using Input/Loss methods, then relationships between Choice Operating Parameters to energy flow inputs and outputs as they are effected by tube leakage flow rate 27, as in the power plant 20, may be understood with enhanced accuracy using this invention. This understanding, in turn, permits the operation of the thermal system to be optimized for heat rate, reduction of polluting effluents and reduced down-time given a tube failure and knowledge of its location.

Within these thermal systems, some quantities are readily measured with adequate accuracy, and others may not be measured on-line (in real time) with accuracy sufficient to quantify the operation of the power plant 20 to the required accuracy to optimize heat rate and/or for the detection of a tube failure and its location. For example, working fluid flow rates, pressures and temperatures may be readily measured with good accuracy by conventional sensors located at defined boundaries such as 23, 30, 25, 33, 42, 29 and 31. Choice Operating Parameters all may, under idea conditions, be directly measured with high accuracy. However, if they are not measured with high accuracy, the ability of Input/Loss methods to quantitatively improve system heat rate may be compromised. In FIG. 1 quantities leading to (or are) Choice Operating Parameters include: the combustion gas concentrations in the regions 35 and 42 (including $CO_2$, $H_2O$, and $O_2$, termed $\Lambda_{1B}$, $\Lambda_{2B}$, $\Lambda_{7B}$ at region 35, and $\Lambda_{1S}$, $\Lambda_{2S}$, $\Lambda_{7S}$ at region 42); the indicated combustion air flow 24 (when combined with indicated fuel flow then allows the Air/Fuel ratio to be determined, $\Lambda_3$, which allows fuel ash fraction to be computed as taught in '711); the ratio of gas concentrations across the air pre-heater, regions 35 and 42 (preferably the $CO_2$ ratio across these regions, thus allowing the Air Pre-Heater Leakage Factor $R_{Act}$ to be determined, $\Lambda_4$); the concentration of $O_2$ in the combustion air local to the system and at 25 (termed $A_{Act}$, or $\Lambda_5$, allowing $\phi_{Act}$ to be determined); and the indicated limestone flow 31 ($\Lambda_6$). In addition to these seven, another Choice Operating Parameter is tube leakage flow rate 27 ($\Lambda_8$), which, in the preferred embodiment, is optimized using the fuel's average water content in the fuel ($WF_{H2O-Ref}$) or the computed As-Fired fuel flow ($m_{AF}$); when optimized the tube leakage flow rate becomes defined consistent with stoichiometrics of Eqs.(19B) and (20), using in-part Eq. (21A). Refer to Eqs.(1 1S) through (18). This invention teaches how to correct such measurements or their assumptions if such measurements are not available; or, in the case of a thermal system having a tube leakage, a measurement of such tube leakage flow rate being impossible to obtain in any reasonable manner without using the teachings of this invention.

FIG. 2 illustrates an important portion of this invention, specifically the general calculational sequences associated with optimizing Choice Operating Parameters and subsequent Fuel Iterations when monitoring a fossil-fired thermal system on-line, i.e., in essentially real time. Box 250 represents general data initialization including establishing Reference Fuel Characteristics, data collection, data organization and routine set-ups of all programs. Box 255 depicts the use of the ERR-CALC program, detailed in FIG. 3, which produces converged Choice Operating Parameters and, given a heat exchanger leak, the tube leakage flow rate. If ERR-CALC is not to be exercised at the same frequency as the Fuel Iterations, Box 255 is bypassed; and, if bypassed, its previously computed correction factors applied to $\Lambda_{0-i}$ are employed within the Fuel Iterations. ERR-CALC may be employed, as-needed, for updating correction factors. Box 260 depicts the FUEL program which reduces fuel data from identified multiple sources, prepares a composite fuel, and then prepares an input file for the system simulator EX-FOSS. Reduction of fuel data involves combining the primary (computed) fuel chemistry from a previous iteration, with secondary fuels which have constant and known chemistries, producing a composite fuel. Box 270 is system data supplied to the process as on-line (or real time) including at least the following Operating Parameters (refer to paragraph 0026 for details): working fluid pressures, tempers and flows, air psychrometrics, useful system output and other related data Box 280 depicts the system simulator EX-FOSS which, given specification of a composite fuel from FUEL, inputs from Box 270, routine set-up data and converged Choice Operating Parameters from Box 255 (including possible tube leakage flow rate), produces the following: boiler efficiency using the methods of '853, As-Fired fuel flow ($m_{AF}$) using Eq.(8), complete effluent concentrations, system heat rate using Eqs.(9) or (10), effluent flow, emission rates of all effluents including the common pollutants, and other thermal performance parameters including, for example, energy flow to the working fluid given a tube leak (BBTC$-m_T\Delta h$), and the Firing Correction (HBC). Box 285 depicts the HEATRATE program within which, given the converged Choice Operating Parameters (including possible tube leakage flow rate), produces fuel chemistry, L Factors and fuel heating value for both the composite fuel (as either higher or lower heating values), and, given the known compositions of secondary fuels, the composition of the primary (unkown) fuel. Box 285 also depicts the computations within HEATRATE which lead to identification of which heat exchanger has the tube leakage; refer to paragraph 0084. Designation 287 tests for convergence of the process based on composite fuel moles (x), certain effluents such as $CO_2$ and $H_2O$, heating value and computed fuel water fraction; if the convergence criteria is not met the process continues to iterate from Box 260. In general, convergences lie within $0.5 \times 10^4$ percent of the computed As-Fired fuel moles. Note that the iterations encompassing 260, 270, 280, 285 and 287 define what is meant by the term "Fuel Iterations". Fuel Iterations are the iterative calculations between EX-FOSS, that is as input with fuel chemistry and heating value from a previous iteration but with unknown effluents (to be computed by EX-FOSS, except for effluent $O_2$ which is input), and HEATRATE as input with known effluents (i.e., the converged Choice Operating Parameters) but with unknown fuel chemistry and heating value (to be computed by HEATRATE).

Designation 290 of FIG. 2 illustrates an important teaching of this invention as it represents a decision to either: 1) continue towards reporting results and quitting if either the Tube Failure Model (i.e., this invention) is not invoked, or is invoked and all computations and processes have been completed; or 2) if the Tube Failure Model is invoked and the location of the failure is desired, to then continue the computations, staring afresh with Box 255 but with every pass trough Box 255 to assume the tube leakage occurs in a different heat exchanger. If the tube failure flow rate and its location are both desired, then summary resolution of these computations (leading to identification of the leakage's location) is performed within the HEATRATE program, Box 285, after all heat exchangers have been analyzed. Typically, monitoring cycles are scheduled for every 2 to 3 minutes using updated data based on 15 minute running averages. Once converged and all computations have been completed, Box 294 produces reportable results from the EX-FOSS and HEATRATE programs, including system heat rate, tube leakage flow and its location, and other thermal performance parameters which are influenced by the failed tube including: Second Law analysis of the thermal system (producing Fuel Consumption Indices), fuel flow, total effluent flow, emission rates, other output and reports to system operators as to what corrective actions may take place, said reports also being provided to regulatory authorities as requested or required Box 298 of FIG. 2 is to quit.

Figure 3:
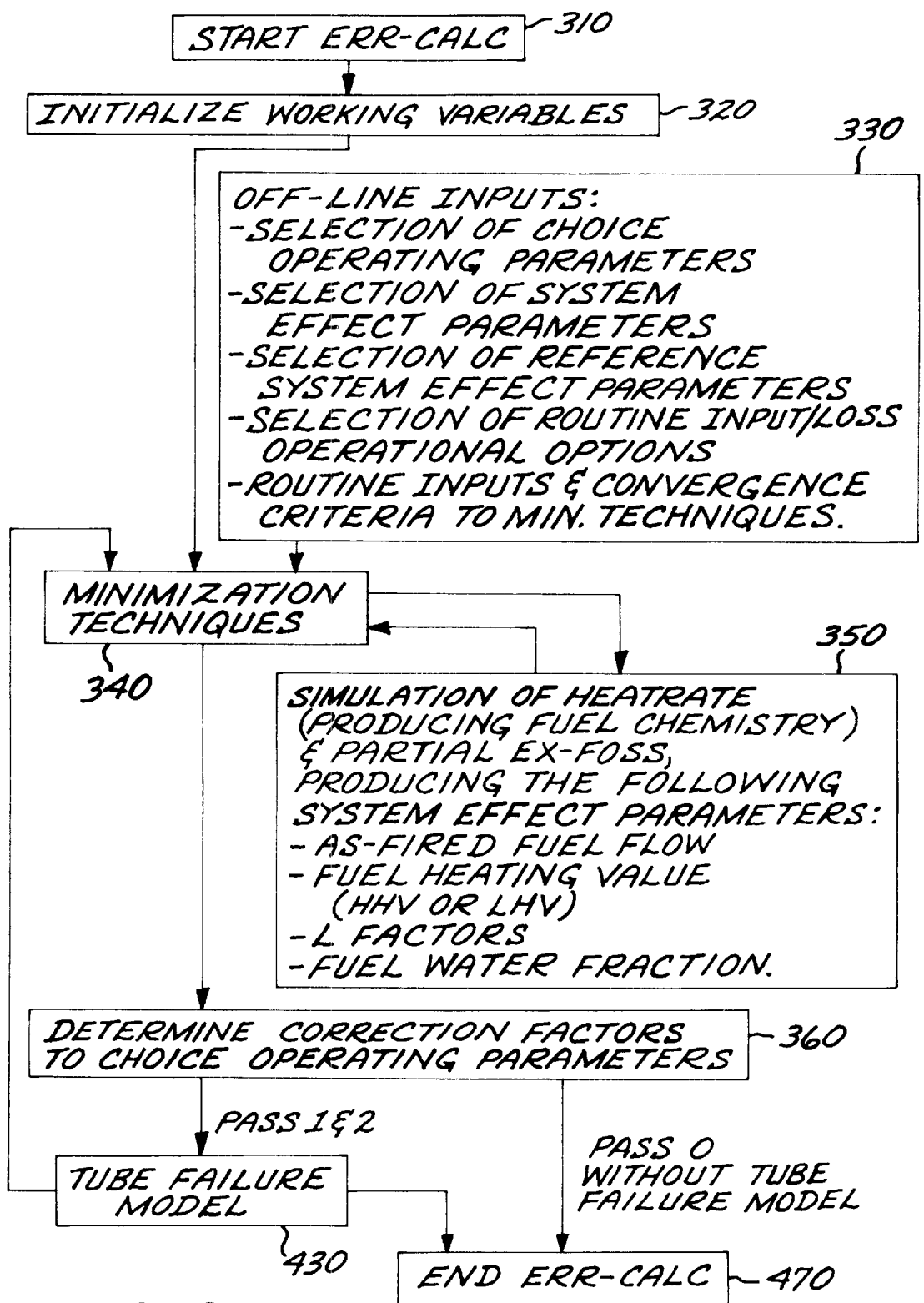
FIG. 3 is a block diagram of the principal functions of the error analysis computer program ERR-CALC which determines optimized Choice Operating Parameters, one of which is the tube failure flow rate.

FIG. 3 illustrates another important portion of this invention, specifically the organization of the ERR-CALC program used to determine correction factors to the initial Choice Operating Parameters, including the computation of tube leakage flow rate if warranted. In FIG. 3 Box 310 depicts the start of the program which invokes data collection and routine program set-up associated with ERR-CALC. Routine program set-up associated with ERR-CALC includes a user option as to whether the Tube Failure Model will be invoked, or not, for a given monitoring cycle (also see Box 250 of FIG. 2). Box 320 depicts initializations of data including organization of data arrays associated with selected Choice Operating and System Effect Parameters, and determination of scaling factors, $S_i$, and pre-scaling factors, $s_i$. Box 330 depicts the selection, collection and processing of general input data associated with the minimization techniques, principally the selection of Choice Operating Parameters, System Effects Parameters, Reference Systems Effects Parameters and routine inputs, options and convergence criteria to the minimization techniques as are known to those skilled in the art using these techniques (such inputs and criteria are presented in cited references in paragraph 0070, also see paragraphs 0058 and 0062 for discussions of step-length inputs associated with the mini ion techniques; also see '879).

Within FIG. 3, if the Tube Failure Model is optioned, Boxes 340, 350 and 360 may be executed three times for the preferred embodiment; these are termed Passes 0, 1 and 2. Any execution of Boxes 340, 350 and 360 as a series is termed Pass 0. Box 340 depicts application of the minimization techniques as herein discussed, including evaluation of an objective function resulting in optimizing the selected Choice Operating Parameters. Box 350 depicts the use of a simulation principally of the HEATRATE program within ERR-CALC by which the computing time required for the supporting computations required for Box 340 are greatly reduced; refer to paragraph 0069 for details. For Simulated Annealing, NN and other such exhaustive procedures, having importance in implementing the preferred embodiment of this invention given a tube failure, Box 350 is typically caused to be executed from Box 340 thousand of times for each Pass. Inputs to Box 350 are principally Choice Operating Parameters. Output from Box 350 to Box 340 being principally System Effect Parameters from which the objective function is then evaluated. After convergence of the minimization techniques of Box 340 and thus resolution of converged Choice Operating Parameters, Box 360 depicts the calculation of correction factors associated with the selected Choice Operating Parameters. Box 360 also includes the production of appropriate warning messages associated with the ERR-CALC computations; for example: non-convergence, computational failures, the automatic switching to alternative minimization techniques, and the like. If the monitoring cycle is processing Pass 0 and the Tube Failure Model is not optioned, the program quits via Box 470.

If the Tube Failure Model is optioned, logic flows as discussed above, from Box 340 through Box 360 resulting in a converged solution (but without an assigned tube leakage). However, within Box 360 logic is then invoke which initiates Pass 1, proceeding to Box 430. For Pass 1, Box 430 tests for a trip mechanism of TABLE 1, and if found that a tube failure is possible, then: re-sets $\Lambda_{1S}$ or $\Lambda_{1B}$, and $\Lambda_{2S}$ or $\Lambda_{2B}$ correction factors to historically based factors (or to unity); selects the System Effect Parameter for file water ($WF_{H2O}$) or for fuel flow ($m_{AF}$) whose difference with reference values is reduced by optimizing Choice Operating Parameter for tube leakage flow ($\Lambda_S$); selects other Choice Operating Parameters and associated System Effect Parameters, excluding $\Lambda_{1S}$, $\Lambda_{1B}$, $\Lambda_{2S}$ and $\Lambda_{2B}$; selects Simulated Annealing as the minimization technique; employs the computed tube leakage flow ($m_T$); and passes control to Box 340. Convergence via Boxes 340 and 350 results in a stoichiometric consistency with the computed tube leakage flow rate. Logic then initiates Pass 2, proceeding to Box 430. For Pass 2, Box 430 then: re-sets all correction factors to unity; selects the same System Effect Parameters and Choice Opting Parameters established in Box 330 (excluding $\Lambda_{2S}$ and $\Lambda_{2B}$), plus System Effect Parameter for fuel water or fuel flow whose differences with their reference values is reduced through optimization; selects the Simulated Annealing technique; employs the computed tube leakage flow rate of Pass 1; and passes control to Box 340. Convergence via Boxes 340 and 350 results in correction factors for all selected Choice Operating Parameters which, in combination, achieve stoichiometric consistency as stated by Eqs.(19B) and (20) with the computed tube leakage flow rate via Eq.(21A). Within Box 360, logic produces appropriate warning messages that a tube failure has occurred (assuming the tube leakage flow rate is greater than zero), its mass flow rate, the associated tube failure mechanism, correction factors, and other routine messages. The execution of ERR-CALC is then terminated with Box 470.

The following summarizes and identifies procedural topics associated with and demonstrated by FIG. 1, FIG. 2 and FIG. 3, and their specific descriptions used in teaching this invention. In addition, many of these topics are broadly discussed throughout the teachings herein and in '932, '711, '853 and '879; the following is not meant to be inclusive:

developing a mathematical model of the combustion process using a molar base as influenced by tube leakage is demonstrated in FIG. 1 and paragraphs 0038 through 0042, and through Eqs.(19B) and (20);

determining the tube leakage in demonstrated in paragraph 0042 and through Eq.(20);

obtaining a molecular weight is considered common art;

obtaining a fuel flow rate of the thermal system is demonstrated by direct observation or by measurement, by any means as defined by "obtaining" see paragraphs 0032 and 0037, and/or through use of Eq.(8);

determining a tube leakage flow rate based on the tube leakage in moles is demonstrated in paragraph 0079 and through Eq.(21B);

reporting the tube leakage flow rate such that corrective action may take place is demonstrated in Box 294 of FIG. 2;

forming and solving a hydrogen balance based on a combustion equation which includes a term for tube leakage is demonstrated in Box 430 of FIG. 3, by Eqs.(19B), (20) and (21A), and discussed in paragraphs 0038 through 0043, further such a hydrogen balance may be a stoichiometric balance involving molar quantities, or a mass balance involving mass flows (such conversions are detailed in '711 and '879 with discussions of conservation of mass flows);

identifying a set of heat exchangers descriptive of the thermal system is considered common art to any thermal system engineer working with his/her system, and is discussed in paragraph 0082;

obtaining a set of Operating Parameters is discussed in paragraph 0026;

analyzing a set of net energy flows to the working fluid from the combustion gases based on the set of identified heat exchangers, the set of Operating Parameters and the tube leakage flow rate, each analyzed set descriptive of the thermal system and wherein each analyzed set the tube leakage flow rate is assigned to a different heat exchanger, resulting in an analyzed set of heat exchangers, is discussed in paragraphs 0081 through 0084, examples are presented in TABLE 3 and TABLE 4, wherein each analyzed set of heat exchangers results in determining key comparative parameters for each heat exchanger (such key comparative parameters to be used in subsequent analysis to determine the location of the leaking heat exchanger);

determining a reference key comparative parameter is demonstrated in paragraph 0084;

obtaining a set of key comparative parameters associated with each identified heat exchanger is demonstrated in paragraph 0084;

determining a set of deviations between the set of key comparative parameters and the reference key comparative parameter is demonstrated in paragraph 0084 through Eqs.(12) and (13);

determining an identification of the leaking heat exchanger based on the set of deviations is demonstrated in paragraphs 0084 through 0086, and through TABLE 3 and TABLE 4;

reporting to the operator of the thermal system the identification of the leaking heat exchanger such that corrective action may take place is demonstrated in Box 294 of FIG. 2;

selecting a set of minimization techniques applicable to the thermal system and its fuel is demons d by Box 330 of FIG. 3, and discussed in paragraphs 0057 through 0068;

selecting or processing a set of routine inputs and convergence criteria to the minimization techniques is demonstrated by Box 330 of FIG. 3, and discussed in paragraphs 0058, 0062 and, to one skilled in the art, references cited in paragraphs 0070 through 0074;

selecting a tube leakage flow rate as a Choice Operating Parameter, tat is $\Lambda_8$ of Eq.(18), and an initial value of tube leakage flow rate is also demonstrated by Box 330 of FIG. 3, and discussed in paragraph 0065, and where an initial value of tube leakage flow rate may be defined as a small positive number such as 500 lbm/hr;

selecting a set of routine Choice Operating Parameters and their initial values is demonstrated by Box 330 of FIG. 3, and discussed in paragraphs 0063 through 0074, specifically in 0065 and 0077, and by Eqs.(11S) through (17B), and where initial values are discussed in paragraphs 0027, 0057 and 0090;

determining a set of System Effect Parameters applicable to the thermal system and its fuel whose functionalities effect the determination of system heat rate and are sensitive to tube leakage flow rate is demonstrated by Box 320 of FIG. 3, and discussed in paragraphs 0029 and 0050 through 0056;

determining a set of Reference System Effect Parameters applicable to the set of System Effect Parameters is demonstrated by Box 330 of FIG. 3, and discussed in paragraphs 0029 and 0050;

determining an objective function applicable to the thermal system's stoichiometric situation is demonstrated in Boxes 330 and 340 of FIG. 3, and discussed in paragraphs 0050, 0051, 0063 and 0064;

optimizing any set of Choice Operating Parameters by employing the set of minimization techniques and the objective function is demonstrated in Boxes 340 and 350 of FIG. 3, and discussed in paragraph 0068;

reporting the tube leakage flow rate such that corrective action may take place is demonstrated in Box 360 of FIG. 3;

determining the fuel chemistry of the fuel being combusted by the thermal system using any one of the Input/Loss methods, using the mathematical model of the combustion process described in paragraphs 0038 through 0041, in '711 and in '853, the set of converged Choice Operating Parameters ($\Lambda_{F-i}$), Operating Parameters and Reference Fuel Characteristics is demonstrated in Boxes 255 and 285 of FIG. 2 and discussed in '711 and herein in paragraphs 0027, 0026, 0028 and 0056, such fuel chemistry consists of fuel elementary constituents, fuel water and fuel ash, together said constituents and fractions comprising a set of fuel concentrations;

determining a fuel heating value of the system using the fuel chemistry is demonstrated in Box 285 of FIG. 2 and discussed in '711;

determining a Firing Correction base on Operating Parameters is demonstrated in Box 280 of FIG. 2, as discussed in '853, the Firing Correction may be assumed to be zero, the preferred embodiment is to compute the Firing Correction as taught in '853;

determining a boiler efficiency of the thermal system independent of fuel flow using the set of converged Choice Operating Parameters including the tube leakage flow rate, the fuel chemistry, the fuel heating value, the Firing Correction and Operating Parameters is demonstrated in Box 280 of FIG. 2 and discussed in '853;

determining an energy flow to the working fluid of the thermal system (BBTC-$m_T \Delta h$) based on the system's Operating Parameters as influenced by the tube leakage flow rate is demonstrated in Box 280 of FIG. 2 and discussed in paragraphs 0026, and 0081 through 0084;

determining a fuel flow is demonstrated in Box 280 of FIG. 2 and discussed in paragraphs 0081 and 0082, and through Eq.(8);

reporting the fuel flow as influenced by the tube leakage flow rate is demonstrated in Box 294 of FIG. 2;

determining a power output from the thermal system is demonstrated in Box 270 of FIG. 2;

determining a system heat rate using the fuel flow, the fuel heating value, the Firing Correction and the power output from the thermal system is demonstrated in Box 280 of FIG. 2 and discussed in paragraph 0081, and through Eq.(9);

reporting the system heat rate as influenced by the tube leakage flow rate is demonstrated in Box 294;

determining a system heat rate using the energy flow to the working fluid, the boiler efficiency and the power output from the thermal system is demonstrated in Box 280 of FIG. 2 and discussed in paragraph 0081, and through Eq.(10);

including a BFGS technique is demonstrated in Box 330 of FIG. 3 and discussed in paragraph 0058;

including or selecting a Simulated Annealing technique is demonstrated in Box 330 of FIG. 3 and discussed in paragraphs 0061 and 0062 whose references also discuss processing a set of routine inputs and convergence criteria;

including a neural network technique is demonstrated in Box 330 of FIG. 3 and discussed in paragraphs 0072 through 0074;

including a Neugents technology, or a Pegasus Technology, or a NeuCo, Inc. technology is demonstrated in Box 330 of FIG. 3 and discussed in paragraphs 0073;

determining a set of scaling factors is demonstrated by Box 320 of FIG. 3, and discussed in paragraphs 0050 and 0068;

determining a set of correction factors to the set of Choice Operating Parameters using their initial and converged values is demonstrated in Box 360 of FIG. 3, in paragraph 0056 via Eq.(1);

optimizing the Choice Operating Parameter of tube leakage flow rate is demonstrated in Boxes 340 and 350 of FIG. 3 and discussed in paragraphs 0079 and 0095;

establishing a set of concentration limits, generally consisting of a set of minimum concentration limits and a set of maximum concentration limits, for the fuel chemistry constituents based on Reference Fuel Characteristics is demonstrated in Box 430 of FIG. 3, and discussed in paragraph 0028;

testing the set of fuel concentrations against the set of concentration limits is demonstrated in Box 430 of FIG. 3, by TABLE 1, and discussed in paragraphs 0042 through 0046, note where such testing may be against only minimum limits, or against only maximum limits, or any combination, or unimportant fuel concentrations may be skipped depending on how well the fuel is characterized and understood;

reporting the trip mechanism to the operator of the thermal system is demonstrated in Box 360 of FIG. 3;

determining a set of correction factor limits for the set of Choice Operating Parameters, generally consisting of a set of minimum correction factors and a set of maximum correction factors is demonstrated in Box 430 of FIG. 3, and discussed in paragraphs 0028 and 0045 and through TABLE 1;

testing the actual correction factors against the set of correction factor limits is demonstrated in Box 430 of FIG. 3, by TABLE 1, and discussed in paragraphs 0042 through 0046.

determining a set of deviations between the set of key comparative parameters and the reference key comparative parameter in demonstrated in paragraph 0084 and via Eqs.(12) and (13);

determining an identification of the leaking heat exchanger based on the set of deviations is demonstrated in paragraphs 0084 and 0085, and by example in TABLE 3 and TABLE 4;

reporting to the operator of the thermal system the identification of the leaking heat exchanger such that corrective action may take place is demonstrated in FIG. 2, Box 294; and determining a reference key comparative parameter, including fuel flow, fuel water fraction, heating value and cleanliness factor for each heat exchanger, is demonstrated in paragraph 0084, noting that others are listed and may be applicable, noting that a key comparative parameter should have applicability to its corresponding reference key comparative parameter when deviations are determined Symbols within equations may have been italicized pursuant to Patent Office publication practices. As used in FIG. 1, FIG. 2, FIG. 3 and throughout the above specification, mathematical symbols typed in italics and mathematical symbols typed in non- italics have the same meaning when taken in context. Understanding context may be afforded through the use of subscripts and/or through the normal flow of mathematical development. Thus, for example, the symbols: $A_{Act}$, $R_{Act}$, $F(\overrightarrow{43x})$, f(), $C_i$, $J_0$, $J_1$, $L'_{Fuel}$, $L'_{Fuel-Ref}$, $L_{k1}$, $WF_{H20}$, $WF_{H20-Ref}$, $x_i$, $\overrightarrow{x}$, AF, HR all defined in Paragraphs 22 through 25, have the same meaning as, respectively: $A_{Act}$, 1, $R_{Act}$, $F(\overrightarrow{x})$, f(), $C_i$, $J_0$, $J_1$, $L'_{Fuel}$, $L'_{Fuel-Ref}$, $L_{k1}$, $WF_{H20}$, $WF_{H20-Ref}$, $x_i$, $\overrightarrow{x}$, AF, HR. The use of italic symbols is used for writing style. For example, in Eq.(19B) the $12^{th}$ letter of English alphabet describes the concentration of effluent $SO_3$ as l[$SO_3$]. Also in Eq.(19B) the $6^{th}$ letter of the English alphabet describes the concentration of effluent $H_2$ as f[$H_2$]; whereas f(or f) describes a functional relationship, for example as used in Paragraphs 0028, 0043 and 0051. For example, as defined in Paragraph 0022, the letter J (or J) with the subscript "Act" describes the "Total effluent water at the system's boundary($j_{Act}+b_A\uparrow$); moles/base"; as opposed to as the letter J (or J) with the subscript "0" or "1", defined in Paragraph 0023, describing the Bessel function of the first kind of order zero or one.

What is claimed is:

1. A method for quantifying the operation of a fossil-fired thermal system through knowledge of when its heat exchanger leaks working fluid into the combustion gas path producing a tube leakage, the method for quantifying the operation comprising the steps of:

monitoring the fossil-fired thermal system by one of the Input/Loss methods, developing a mathematical model of the combustion process incorporating terms commonly associated with fossil fuel combustion and terms associated with sources of working fluid flows into the combustion gas path including tube leakage resulting in a stoichiometric model of the combustion process using a molar base, and determining a tube leakage in moles based on the stoichiometric model of the combustion process using a molar base.

2. The method according to claim 1 further comprising the steps, after determining, of:

obtaining a molecular weight of the fossil fuel, obtaining a molecular weight of the working fluid, obtaining a fuel flow rate of the thermal system, determining a tube leakage flow rate based on the tube leakage in moles, the molecular weight of the fossil fuel, the molecular weight of the working fluid, the fuel flow rate, and the stoichiometric model of the combustion process using a molar base, and reporting the tube leakage flow rate such that corrective action may take place.

3. The method according to claim 2 further comprising the steps, after reporting, of:

identifying a set of heat exchangers descriptive of the thermal system as employed to transfer net energy flow to the working fluid from the combustion gases resulting in a set of identified heat exchangers, obtaining a set of Operating Parameters applicable to the set of identified heat exchangers, analyzing a set of net energy flows to the working fluid from the combustion gases based on the set of identified heat exchangers, the set of Operating Parameters and the tube leakage flow rate, each analyzed set descriptive of thermal system and wherein each analyzed set the tube leakage flow rate is assigned to a different heat exchanger, resulting in an analyzed set of heat exchangers, determining a reference key comparative parameter for the thermal system, obtaining a set of key comparative parameters associated with each identified heat exchanger, applicable with the reference key comparative parameter, and based on the analyzed set of heat exchangers, determining a set of deviations between the set of key comparative parameters and the reference key comparative parameter, determining an identification of the leaking heat exchanger based on the set of deviations, and reporting to the operator of the thermal system the identification of the leaking heat exchanger such that corrective action may take place.

4. The method of claim 1, wherein the step of determining the tube leakage in moles comprises the steps of:

forming a hydrogen stoichiometric balance based on the stoichiometric model of the combustion process using a molar base, and solving the hydrogen stoichiometric balance for the tube leakage in moles.

5. A method for quantifying the operation of a fossil-fired thermal system when being monitored by one of the Input/Loss methods through knowledge of when its heat exchanger leaks working fluid into the combustion gas path producing a tube leakage, the method for quantifying the operation comprising the steps of:

developing a mathematical model of the combustion process incorporating terms commonly associated with fossil fuel combustion and terms associated with sources of working fluid flows into the combustion gas path including tube leakage resulting in a stoichiometric model of the combustion process, selecting a set of minimization techniques applicable to the thermal system and its fuel, and a set of routine inputs and convergence criteria to the minimization techniques, selecting a Choice Operating Parameter of tube leakage flow rate, selecting a set of routine Choice Operating Parameters, determining a set of System Effect Parameters applicable to the thermal system and its fuel whose functionalities effect the determination of system heat rate and are sensitive to tube leakage flow rate, determining a set of Reference System Effect Parameters applicable to the set of System Effect Parameters, determining an objective function applicable to the thermal system's stoichiometric situation which uses the Choice Operating Parameter of tube leakage flow rate, the set of routine Choice Operating Parameters, the set of System Effect Parameters, and the set of Reference System Effect Parameters, optimizing the Choice Operating Parameter of tube leakage flow rate and the set of routine Choice Operating Parameters based on the mathematical model of the combustion process, the set of minimization techniques and the objective function such that convergence criteria is met resulting in a set of converged Choice Operating Parameters including the tube leakage flow rate, and reporting the tube leakage flow rate such that corrective action may take place.

6. The method according to claim 5 further comprising the steps, after reporting, of:

determining a set of Reference Fuel Characteristics, determining the fuel chemistry of the fuel being combusted by the thermal system using one of the Input/Loss methods, the mathematical model of the combustion process, the set of converged Choice Operating Parameters, and the set of Reference Fuel Characteristics, determining a fuel heating value of the system based on the fuel chemistry and the set of Reference Fuel Characteristics, obtaining a set of Operating Parameters, determining a Firing Correction base on the set of Operating Parameters, and determining a boiler efficiency of the thermal system independent of fuel flow based on the set of converged Choice Operating Parameters including the tube leakage flow rate, the fuel chemistry, the fuel heating value, the Firing Correction and the set of Operating Parameters.

7. The method according to claim 6 further comprising the steps, after determining the boiler efficiency, of:

determining an energy flow to the working fluid of thermal system based on the set of Operating Parameters as influenced by the tube leakage flow rate, determining a fuel flow of the fossil fuel being combusted using the energy flow to the working fluid, the fuel heating value, the Firing Correction and the boiler efficiency, and reporting the fuel flow as influenced by the tube leakage flow rate.

8. The method according to claim 7 further comprising the steps, after reporting, of:

determining a power output from the thermal system, determining a system heat rate using the fuel flow, the fuel heating value, the Firing Correction and the power output from the thermal system, and reporting the system heat rate as influenced by the tube leakage flow rate.

9. The method according to claim 7 fie comprising the steps, after reporting, of:

determining a power output from the thermal system, determining a system heat rate using the energy flow to the working fluid, the boiler efficiency and the power output from the thermal system, and reporting the system heat rate as influenced by the tube leakage flow rate.

10. The method of claim 5, wherein the step of selecting the set of minimization techniques applicable to the thermal system and its fuel comprises a step of:

incorporating a BFGS technique applicable to the thermal system and its fuel.

11. The method of claim 5, wherein the step of selecting the set of minimization techniques applicable to the thermal system and its fuel comprises a step of:

incorporating a Simulated Annealing technique applicable to the thermal system and its fuel.

12. The method of claim 5, wherein the step of selecting the set of minimization techniques applicable to the thermal system and its fuel comprises a step of:

incorporating a neural Rework technique applicable to the thermal system and its fuel.

13. The method of claim 5, wherein the step of selecting the set of minimization on techniques applicable to the thermal system and its fuel comprises a step of:

incorporating a Neugents technology applicable to the thermal system and its fuel.

14. The method of claim 5, wherein the step of selecting the set of minimization techniques applicable to the thermal system and its fuel comprises a step of:

incorporating a Pegasus Technology applicable to the thermal system and its fuel.

15. The method of claim 5, wherein the step of selecting the set of minimization techniques applicable to the thermal system and its fuel comprises a step of:

incorporating a NeuCo, Inc. technology.

16. The method of claim 5, wherein the step of selecting the set of routine Choice Operating Parameters comprises a step of:

determining a set of scaling factors for the set of routine Choice Operating Parameters resulting in the set of routine Choice Operating Parameters whose values are scaled.

17. The method according to claim 5 further comprising the steps, after reporting, of:
- identifying a set of heat exchangers descriptive of the thermal system as employed to transfer net energy flow to the working fluid from the combustion gases resulting in a set of identified heat exchangers,
- obtaining a set of Operating Parameters applicable to the set of identified heat exchangers,
- analyzing a set of net energy flows to the working fluid from the combustion gases based on the set of identified heat exchangers, the set of Operating Parameters and the tube leakage flow rate, each analyzed set descriptive of the thermal system and wherein each analyzed set the tube leakage flow rate is assigned to a different heat exchanger, resulting in an analyzed set of heat exchangers,
- determining a reference key comparative parameter for the thermal system,
- obtaining a set of key comparative parameters associated with each identified heat exchanger, applicable with the reference key comparative parameter, and based on the analyzed set of heat exchangers,
- determining a set of deviations between the set of key comparative parameters and the reference key comparative parameter,
- determining an identification of the leaking heat exchanger based on the set of deviations, and
- reporting to the operator of the thermal system the identification of the leaking heat exchanger such that corrective action may take place.

18. The method of claim 17, wherein the step of determining the referee key comparative parameter for the thermal system, comprises a step of:
- selecting a fuel flow as the reference key comparative parameter for the thermal system.

19. The method of claim 17, wherein the step of determining the reference key comparative parameter for the thermal system, comprises a step of:
- selecting a fuel water fraction as the reference key comparative parameter.

20. The method of claim 17, wherein the step of determining the reference key comparative parameter for the thermal system, comprises a step of:
- selecting a heating value as the reference key comparative parameter.

21. The method of claim 17, wherein the step of determining the reference key comparative parameter for the thermal system, comprises a step of:
- selecting a computed cleanliness factor for each heat exchanger as the reference key comparative parameter for the thermal system.

22. A method for quantifying the operation of a fossil-fired thermal system when being monitored on-line by The Input/Loss Method through knowledge of when its heat exchanger leaks working fluid into the combustion gas path producing a tube leakage flow rate, the method comprising the steps of:
- before on-line operation,
  - developing a mathematical model of the combustion process incorporating terms commonly associated with fossil fuel combustion and terms associated with sources of working fluid flows into the combustion gas path including tube leakage resulting in a stoichiometric model of the combustion process, and
  - selecting a set of minimization techniques applicable to the thermal system and its fuel, and a set of routine inputs and convergence criteria to the minimization techniques; and thereafter
- performing a Pass 0 monitoring cycle while operating on-line which determines a trip mechanism associated with a tube leakage flow rate, comprising the steps of:
  - assuming a tube leakage flow rate is zero,
  - selecting a set of routine Choice Operating Parameters,
  - determining a set of System Effect Parameters applicable to the thermal system and its fuel whose functionalities effect the determination of system heat rate, and determining applicable Reference System Effect Parameters,
  - performing a Pass 0 monitoring cycle using The Input/Loss Method resulting in a set of fuel concentrations and correction factors to the set of routine Choice Operating Parameters,
  - testing the set of fuel concentrations and correction factors against a set of corresponding limits resulting in a trip mechanism indicating the stoichiometric reason how a heat exchanger may leak a tube leakage flow rate into the combustion gas path, and
  - assuming the trip mechanism indicates a tube leakage flow rate is possible; and thereafter
- performing a Pass 1 monitoring cycle while operating on-line which determines a tube leakage flow rate, comprising the steps of:
  - multiplying a value of uncorrected effluent water concentration by a reference correction factor resulting in a constant effluent water concentration,
  - multiplying a value of uncorrected effluent carbon dioxide concentration by a reference correction factor resulting in a constant effluent carbon dioxide concentration,
  - selecting a set of routine Choice Operating Parameters including tube leakage flow rate but excluding effluent water and carbon dioxide,
  - determining a set of System Effect Parameters applicable to the thermal system and its fuel whose functionalities effect the determination of system heat rate and are sensitive to tube leakage flow rate, and determining applicable Reference System Effect Parameters,
  - performing a Pass 1 monitoring cycle using The Input/Loss Method resulting in a set of converged Choice Operating Parameters including the tube leakage flow rate, and thereafter;
- reporting the tube leakage flow rate such that corrective action may take place.

23. A method for quantifying the operation of a fossil-fired thermal system when being monitored by one of the Input/Loss methods through knowledge of a stoichiometric mechanism of how a heat exchanger could be leaking a tube leakage flow rate into the combustion gas path, the method for quantifying the operation comprising the steps of:
- developing a mathematical model of the combustion process incorporating terms commonly associated with fossil fuel combustion and terms associated with sources of working fluid flows into the combustion gas path including tube leakage,
- obtaining a set of Choice Operating Parameters,
- obtaining a set of Reference Fuel Characteristics,
- obtaining a fuel chemistry of the fuel being combusted by the thermal system using one of the Input/Loss methods, the mathematical model of the combustion process, the set of Choice Operating Parameters, and the set of Reference Fuel Characteristics, said fuel chemistry resulting in a set of fuel concentrations, establishing a set of concentration limits for each fuel constituent based on Reference Fuel Characteristics, testing the set of fuel concentrations against the set of concentration limits resulting in a trip mechanism indicating the stoichiometric reason how a heat exchanger leaks a tube leakage flow rate into the combustion gas path, and reporting the trip mechanism to the operator of the thermal system.

24. A method for quantifying the operation of a fossil-fired thermal system when being monitored by one of the Input/Loss methods through knowledge of a stoichiometric mechanism of how a heat exchanger could be leaking a tube leakage flow rate into the combustion gas path, the method for quantifying the operation comprising the steps of:

developing a mathematical model of the combustion process incorporating terms commonly associated with fossil fuel combustion and terms associated with sources of working fluid flows into the combustion gas path including tube leakage, selecting a set of minimization techniques applicable to the thermal system and its fuel, processing a set of routine inputs and convergence criteria to the minimization techniques, assuming a tube leakage flow rate is zero, selecting a set of routine Choice Operating Parameters, determining a set of System Effect Parameters applicable to the thermal system and its fuel whose functionalities effect the determination of system heat rate, determining a set of Reference System Effect Parameters applicable to the set of System Effect Parameters, determining an objective function applicable to the thermal system, the set of routine Choice Operating Parameters, the set of System Effect Parameters and the set of Reference System Effect Parameters, optimizing the set of routine Choice Operating Parameters based on the mathematical model of the combustion process, the set of minimization techniques, and the objective function such that convergence is met resulting in a set of converged Choice Operating Parameters, determining a fuel chemistry of the fuel being combusted by the thermal system using one of the Input/Loss methods, the mathematical model of the combustion process, the set of converged Choice Operating Parameters, and Reference Fuel Characteristics resulting in a fuel elementary composition, a fuel ash fiction and a fuel water fraction said composition and fractions resulting in a set of fuel concentrations, establishing a set of concentration limits for the set of fuel concentrations based on Reference Fuel Characteristics, testing the set of fuel concentrations against the set of concentration limits resulting in a trip mechanism indicating the stoichiometric reason how a heat exchanger leaks a tube leakage flow rate into the combustion gas path, and reporting the trip mechanism to the operator of the thermal system.

25. The method of claim 24, wherein the step of establishing the set of concentration limits for the set of fuel concentrations based on Reference Fuel Characteristics and the step of testing the set of fuel concentrations against the concentration limits, comprises the steps of:

determining a set of correction factors to Choice Operating Parameters using their initial and converged values, and establishing a set of correction factor limits for the selected Choice Operating Parameters, and testing the set of correction factors against the set of correction factor limits resulting in a trip mechanism indicating the stoichiometric reason how a heat exchanger leaks a tube leakage flow rate into the combustion gas path.

26. A method for quantifying the operation of a thermal system burning a fossil fuel in a combustion process through knowledge of when one of its heat exchangers, whose tubes contain working fluid heated by products of combustion, has a tube leak of working fluid mixing with the products of combustion, the method for quantifying the operation comprising the steps of:

selecting a neural network technology applicable to the thermal system, selecting a set of routine inputs and database for the neural network technology, selecting a set of Choice Operating Parameters including tube leakage flow rate, developing a mathematical model of the combustion process incorporating terms commonly associated with a combustion process and terms associated with sources of working fluid mixing with the products of combustion including tube leakage, obtaining a set of Reference System Effect Parameters associated with the thermal system, calculating a set of System Effect Parameters based on the mathematical model of the combustion process, optimizing the set of Choice Operating Parameters including tube leakage flow rate using the neural network technology, and the set of routine inputs and database, the set of Reference System Effect Parameters and the set of System Effect Parameters, such that convergence is met resulting in a set of converged Choice Operating Parameters including a tube leakage flow rate, and reporting the tube leakage flow rate such that corrective action may take place.

27. The method of claim 26, wherein the step of selecting the neural network technology applicable to the thermal system and its fuel, comprises a step of:

selecting a Neugents technology applicable to the thermal system and its fuel.

28. The method of claim 26, wherein the step of selecting the neural network technology applicable to the thermal system and its fuel, comprises a step of:

selecting a Pegasus Technology applicable to the thermal system and its fuel.

29. The method of claim 26, wherein the step of selecting the neural network technology applicable to the thermal system and its fuel, comprises a step of:

selecting a NeuCo, Inc. technology applicable to the thermal system and its fuel.

30. A method for quantifying the operation of a fossil-fired thermal system when being monitored by one of the Input/Loss methods coincident with one of its heat exchangers leaking its working fluid into the combustion gas path producing a tube leakage flow, the method for quantifying the operation by identification of the leaking heat exchanger comprising the steps of:

identifying a set of heat exchangers descriptive of the thermal system as employed to transfer net energy flow to the working fluid from the combustion gases resulting in a set of identified heat exchangers, obtaining a set of Operating Parameters applicable to the set of identified heat exchangers, analyzing a set of net energy flows to the working fluid from the combustion gases based on the set of identified heat exchangers, the set of Operating Parameters and the tube leakage flow rate, each analyzed set descriptive of the thermal system and wherein each analyzed set the tube leakage flow rate is assigned to a different heat exchanger, resulting in an analyzed set of heat exchangers, determining a reference key comparative parameter for the thermal system, obtaining a set of key comparative parameters associated with each identified heat exchanger, applicable with the reference key comparative parameter, and based on the analyzed set of heat exchangers, determining a set of deviations between the set of key comparative parameters and the reference key comparative parameter, determining an identification of the leaking heat exchanger based on the set of deviations, and reporting to the operator of the thermal system the identification of the leaking heat exchanger such that corrective action may take place.

31. The method of claim 30, wherein the step of determining the reference key comparative parameter for the thermal system, comprises a step of:

selecting a fuel flow as the reference key comparative parameter for the thermal system.

32. The method of claim 30, wherein the step of determining the reference key comparative parameter for the thermal system, comprises a step of:

selecting a fuel water fraction as the reference key comparative parameter for the thermal system.

33. The method of claim 30, wherein the step of determining the reference key comparative parameter for the thermal system, comprises a step of:

selecting a heating value as the reference key comparative parameter for the thermal system.

34. The method of claim 30, wherein the step of determining the reference key comparative parameter for the thermal system, comprises a step of:

selecting a computed cleanliness factor for each heat exchanger as the reference key comparative parameter for the thermal system.

35. A method for quantifying the operation of a thermal system burning a fossil fuel in a combustion process through knowledge of when one of its heat exchangers, whose tubes contain working fluid heated by products of combustion, has a tube leak of working fluid mixing with the products of combustion, the method for quantifying the operation comprising the steps of:

monitoring the thermal system using one of the Input/Loss methods, developing a mathematical model of the combustion process incorporating terms commonly associated with the combustion process and terms associated with sources of working fluid mixing with the products of combustion including tube leakage, determining a tube leakage based on the mathematical model of the combustion process, and reporting the tube leakage such that corrective action may take place.

36. The method of claim 35, wherein the step of developing a mathematical model of the combustion process comprises the steps of:

forming a hydrogen stoichiometric balance of the combustion process including terms associated with sources of working fluid mixing with the combustion products including tube leakage, and solving the hydrogen stoichiometric balance for the tube leakage.

37. The method of claim 35, wherein the step of monitoring the thermal system using one of the Input/Loss methods, comprises the step of:

monitoring the thermal system using The Input/Loss Method.

38. The method of claim 35, wherein the step of monitoring the thermal system using one of the Input/Loss methods, comprises the step of:

determining a fuel chemistry based on one of the Input/Loss methods.

39. The method of claim 35, wherein the step of monitoring the thermal system using one of the Input/Loss methods, comprises the steps of:

determining a fuel heating value based on one of the Input/Loss methods.

40. The method of claim 35 further comprising the steps, after reporting, of:

identifying a set of heat exchangers descriptive of the thermal system resulting in a set of identified heat exchangers, obtaining a set of Operating Parameters applicable to the set of identified heat exchangers resulting in a set of heat exchanger data sufficient to determine net energy flow to the working fluid from the products of combustion for each heat exchanger in the set of identified heat exchangers, calculating a net energy flow to the working fluid of the thermal system as many times as there are heat exchangers in the set of identified heat exchangers, wherein each calculation of net energy flow includes all heat exchangers in the set of identified heat exchangers, wherein for each calculation of net energy flow the tube leakage is assigned to a different heat exchanger, resulting in a set of analyzed heat exchangers based on the set of heat exchanger data, determining a set of reference key comparative parameters, obtaining a set of key comparative parameters associated with the set of identified heat exchangers applicable with the set of reference key comparative parameters, and based on the set of analyzed heat exchangers, determining a set of deviations between the set of key comparative parameters and the set of reference key comparative parameters, identifying a location of the heat exchanger within the thermal system having the tube leak based on the set of deviations, and reporting to the operator of the thermal system the location of the heat exchanger within the thermal system having the tube leak such that corrective action may take place.

41. A method for quantifying the operation of a thermal system burning a fossil fuel in a combustion process through knowledge of when one of its heat exchangers, whose tubes contain working fluid heated by products of combustion, has a tube leak of working fluid mixing with the products of combustion, the method for quantifying the operation comprising determining a location of the heat exchanger within the thermal system with the tube leak based on the working fluid's energy flow by assigning the tube leak to different heat exchangers.

42. The method of claim 41 further comprising:

obtaining a boiler efficiency, obtaining a fossil fuel heating value, obtaining a Firing Correction applicable to the thermal system, and determining a calculated fuel flow based on the working fluid's energy flow effected by the tube leak of working fluid, the location of the heat exchanger within the thermal system with the tube leak, the boiler efficiency, the fossil fuel heating value, and the Firing Correction.

43. The method of claim 41 further comprising:

obtaining a boiler efficiency, obtaining a power produced from the thermal system, determining a calculated heat rate of the thermal system based on the working fluid's energy flow effected by the tube leak of working fluid, the location of the heat exchanger within the thermal system with the tube leak, the boiler efficiency and the power produced from the thermal system.

* * * * *

UNITED STATES PATENT AND TRADEMARK OFFICE
CERTIFICATE OF CORRECTION

PATENT NO. : 6,651,035 B1
DATED : November 18, 2003
INVENTOR(S) : Fred D. Lang

It is certified that error appears in the above-identified patent and that said Letters Patent is hereby corrected as shown below:

Column 2,
Line 30, after the phrase "(hereinafter termed '711)" insert -- now US Patent No. 6,522,994 issued Feb. 18, 2003 --
Line 31, after the phrase "(hereinafter termed '853)" insert -- now US Patent No. 6,584,429 issued June 24, 2003 --

Column 5,
Line 40, delete "a = Molar fraction" and insert -- a = Moles --
Line 44, delete "$a_{Dry-theror}$ = Molar fraction" and insert -- $a_{Dry-theor}$ = Moles --
Line 49, delete "molar ratio" and insert -- molar fraction --
Line 53, delete "$b_T$ = Tube leakage molar fraction;" and insert -- $b_T$ = Tube leakage moles; --
Line 59, delete "$b_{PLS}$ = Fraction" and insert -- $b_{PLS}$ = Moles --

Column 6,
Line 10, delete "$d_{Act}$, $g_{Act}$, h, $k_{Act}$, $e_{Act}$," and insert -- $d_{Act}$, $g_{Act}$, h, $k_{Act}$, $e_{Act}$, --
Line 34, delete "z = Moles of $H_2O$ per effluent $CaSO_4$" and insert -- z = Moles of $H_2O$ per mole of effluent $CaSO_4$ --
Line 45, embedded equation reading "$\beta \equiv (R_{Act} - 1.0) / [a\, R_{Act} (1.0 + \Phi_{Act})]$" should read as follows: -- $\beta \equiv 100(R_{Act} - 1.0) / [a\, R_{Act} (1.0 + \Phi_{Act})]$ --
Line 62, embedded expression "f( )" should read -- $f( )$ --
Line 64, embedded expression "$HHV_{k3}$ = f[fuel" should read -- $HHV_{k3} = f$[fuel --

Column 8,
Line 13, delete "based on $HHF_{AF}$" and insert -- based on $HHV_{AF}$ --
Line 17, delete "$\equiv 3412.1416/\eta_{System}$" and insert a new line, after line 17,
-- HR $\equiv 3412.1416/\eta_{System}$ --

Column 10,
Line 7, embedded expression "$\alpha_{MAF-10} = f(HIIV_{MAF})$" should read
-- $\alpha_{MAF-10} = f(HHV_{MAF})$ --

UNITED STATES PATENT AND TRADEMARK OFFICE
CERTIFICATE OF CORRECTION

PATENT NO. : 6,651,035 B1
DATED : November 18, 2003
INVENTOR(S) : Fred D. Lang

It is certified that error appears in the above-identified patent and that said Letters Patent is hereby corrected as shown below:

Column 12,
Lines 3-15, the equation (19B) should read:

$$-- x \, [ \, \alpha_0[C_{YR}H_{ZR}] + \alpha_1[N_2] + \alpha_2[H_2O] + \alpha_3[O_2] + \alpha_4[C] + \alpha_5[H_2] + \alpha_6[S]$$
$$+ \alpha_7[CO_2] + \alpha_8[CO] + \alpha_9[H_2S] + \alpha_{10}[Ash] \, ]_{As\text{-}Fired\,Fuel}$$
$$+ b_Z[H_2O]_{In\text{-}Leakage} + [\,(1.0 + \beta)(a[O_2] + a\phi_{Act}[N_2] + b_A[H_2O]) \, ]_{Air}$$
$$+ [\,(1.0 + \gamma)b_{PLS}[CaCO_3] \, ]_{As\text{-}Fired\,PLS} + b_T[H_2O]_{Tube\text{-}Leakage}$$
$$= d_{Act}[CO_2] + g_{Act}[O_2] + h[N_2] + j_{Act}[H_2O] + k_{Act}[SO_2]$$
$$+ [\, e_{Act}[CO] + f[H_2] + l[SO_3] + m[NO]$$
$$+ p[N_2O] + q[NO_2] + t[C_{YP1}H_{ZP1}] + u[C_{YP2}H_{ZP2}] \, ]_{Minor\,Components}$$
$$+ x\alpha_{10}[ash] + \sigma b_{PLS}[CaSO_4 \cdot zH_2O]$$
$$+ [(1.0 - \sigma + \gamma)b_{PLS}[CaO] \, ]_{Excess\,PLS} + v[C_{Refuse}]$$
$$+ [\, \beta(a[O_2] + a\phi_{Act}[N_2] + b_A[H_2O]) \, ]_{Air\,Leakage} \qquad (19B) \; --$$

Column 13,
Line 5, delete "The second line of Eq.(20)" and insert -- The last five terms of Eq.(20) (i.e., $x\alpha_9$, f, (ZP1)t/2, (ZP2)u/2, and $\sigma z b_{PLS}$) --
Lines 39-40, the embedded expression "$\alpha_{MAF-5} = f(\alpha_{MAF-4})$" should read -- $\alpha_{MAF-5} = f(\alpha_{MAF-4})$ --
Lines 56-57, the embedded expression "$\alpha_{MAF-}5 < \alpha_{MAF-5/\,min}$" should read -- $\alpha_{MAF-5} < \alpha_{MAF=5/\,min}$ --

Column 16,
Line 5, delete "(defined as $\Lambda_2 S$" and insert -- (defined as $\Lambda_{2S}$ --

Column 17,
Line 61, the embedded expression "$x_{MAF\text{-}theor} \, N_{MAF\text{-}Fuel} \, HV_{MAF} = $" should read -- $x_{MAF\text{-}theor} \, N_{MAF\text{-}Fuel} \, HHV_{MAF} = $ --

Column 21,
Line 20, the embedded expression "$M_E = 1.40$)" should read -- $M_W = 1.40$) --
Lines 40-41, which read:

" $[(\bar{m}_{AF} - m_{AF\text{-}PLT}) / m_{AF\text{-}PLT}]^{M_W\text{-}1} \, [\partial m_{AF} / (m_{AF\text{-}PLT} \, \partial \Lambda_i)]$; and
$\lambda_L, \lambda_W, \lambda_H, \lambda_T$ and $\bar{m}_{AF}$ are average values. Gradients, "
should read:
-- $[(\bar{m}_{AF} - m_{AF\text{-}PLT}) / m_{AF\text{-}PLT}]^{M_W\text{-}1} \, [\partial m_{AF} / (m_{AF\text{-}PLT} \, \partial \Lambda_i)]$; and
$\lambda_L, \lambda_W, \lambda_H, \lambda_T$ and $\bar{m}_{AF}$ are average values. Gradients, --

UNITED STATES PATENT AND TRADEMARK OFFICE
CERTIFICATE OF CORRECTION

PATENT NO. : 6,651,035 B1
DATED : November 18, 2003
INVENTOR(S) : Fred D. Lang

It is certified that error appears in the above-identified patent and that said Letters Patent is hereby corrected as shown below:

Column 21,
Line 57, which reads:

" $\bar{m}_{AF} - m_{AF-PLT}) / m_{AF-PLT}]^{Mw-1} [\partial m_{AF}/(m_{AF-PLT} \partial \Lambda_j)]$. "

should read:

-- $[(\bar{m}_{AF} - m_{AF-PLT}) / m_{AF-PLT}]^{Mw-1} [\partial m_{AF}/(m_{AF-PLT} \partial \Lambda_j)]$. --

Column 28,
Line 2, delete "Parameter $\lambda_{1S}$" and insert -- Parameter $\Lambda_{1S}$ --
Line 49, delete "&s Bv".

Column 29,
Line 13, insert equation (8): -- $m_{AF} = (BBTC - m_T \Delta h) / [\eta_{B-HHV} (HHVP + HBC)]$ (8) --
Lines 65-66, delete "boiler efficiency;" and insert -- boiler efficiency --

Column 30,
Line 7, embedded equation "$(h_{Steam} - h_{Leak}$ a)" should read -- $(h_{Steam} - h_{Leak})$ --
Lines 27-29, equation (12) should read:

-- $\text{Deviation} = 0.05 |(m_{AF-PLT} - m_{AF})/m_{AF-PLT}|$
$+ 0.75 |(WF_{H2O-Ref} - WF_{H2O})/WF_{H2O-Ref}|$
$+ 0.20 |(HHV_{Ref} - HHV)/HHV_{Ref}|$ (12) --

Column 31,
Line 26, delete "in paragraphs 0075 through 0080" and insert -- in the above section denoted Tube Leakage Flow Rate Computations --

Column 32,
Line 15, delete "an identification the" and insert -- an identification of the --

Column 33,
Lines 8-9, delete "in paragraphs 0047 through 0074" and insert -- in the above section denoted Minimization Techniques, Background --
Line 60, delete "explained in paragraph 0082." and insert -- explained below Eq.(10). --

Column 34,
Line 56, delete "under idea conditions," and insert -- under ideal conditions, --

Column 36,
Line 2, delete "refer to paragraph 0084." and insert -- refer to the paragraph containing Eq.(12). --

UNITED STATES PATENT AND TRADEMARK OFFICE
CERTIFICATE OF CORRECTION

PATENT NO. : 6,651,035 B1
DATED : November 18, 2003
INVENTOR(S) : Fred D. Lang

It is certified that error appears in the above-identified patent and that said Letters Patent is hereby corrected as shown below:

Column 37,
Line 15, delete "refer to paragraph 0069 for details." and insert -- refer to the paragraph below Eq.(7) for details. --

Column 41,
Line 42, delete "Symbols within equa-"
Line 43, delete "tions" and insert, starting a new paragraph, the following:
-- Symbols within equations --
Lines 51-53, which reads:

"The symbols: $A_{Act}$, 1, $R_{Act}$, $F(\vec{x})$, $f(\ )$, $C_i$, $J_0$, $J_1$, $L'_{Fuel}$, $L'_{Fuel-Ref}$, $L_{kl}$, $WF_{H2O}$, $WF_{H2O-Ref}$, $x_i$, $\vec{x}$, AF, HR all defined in Paragraphs 22 through 25, have the same "

should read:

-- the symbols: $A_{Act}$, $l$, $R_{Act}$, $F(\vec{x})$, $f(\ )$, $C_i$, $J_0$, $J_1$, $L'_{Fuel}$, $L'_{Fuel-Ref}$ $L_{kl}$, $WF_{H2O}$, $WF_{H2O-Ref}$, $x_i$, $\vec{x}$, $AF$, $HR$ all defined in the above section marked Definitions of Equation Terms with Typical Units of Measure, have the same --

Line 61, the embedded expression "1[SO$_3$]" should read -- $l$[SO$_3$] --
Line 63, delete "whereas f(or f)" and insert -- whereas $f$(or f) --
Line 66, delete the letter J (or J)" and insert -- the letter J (or $J$) --

Column 42,
Line 1, the embedded expression " $(j_{Act} + b_A ↑)$" should read -- $(j_{Act} + b_A\beta)$ --

Line 2, delete "letter J (or J)" and insert -- the letter $J$ (or J) --

Column 44,
Line 41, claim 12, should read:

-- 12. The method of claim 5, wherein the step of selecting the set of minimization techniques applicable to the thermal system and its fuel comprises a step of:
    incorporating a neural network technique applicable to the thermal system and its fuel. --

UNITED STATES PATENT AND TRADEMARK OFFICE
CERTIFICATE OF CORRECTION

PATENT NO. : 6,651,035 B1
DATED : November 18, 2003
INVENTOR(S) : Fred D. Lang

It is certified that error appears in the above-identified patent and that said Letters Patent is hereby corrected as shown below:

Column 45,
Line 32, claim 18, should read:
-- 18. The method of claim 17, wherein the step of determining the reference key comparative parameter for the thermal system, comprises a step of:
    selecting a fuel flow as the reference key comparative parameter for the thermal system.. --

Signed and Sealed this

Seventh Day of December, 2004

JON W. DUDAS
*Director of the United States Patent and Trademark Office*